United States Patent
Yerramalli et al.

(10) Patent No.: US 9,860,776 B2
(45) Date of Patent: Jan. 2, 2018

(54) METHOD AND APPARATUS FOR REDUCING SELF-JAMMING OF TRANSMISSIONS ON ADJACENT CARRIERS

(71) Applicant: QUALCOMM Incorporated, San Diego, CA (US)

(72) Inventors: Srinivas Yerramalli, San Diego, CA (US); Tao Luo, San Diego, CA (US); Kiran Kumar Somasundaram, San Diego, CA (US); Durga Prasad Malladi, San Diego, CA (US); Naga Bhushan, San Diego, CA (US); Yongbin Wei, La Jolla, CA (US); Aleksandar Damnjanovic, Del Mar, CA (US); Wanshi Chen, San Diego, CA (US); Xiaoxia Zhang, San Diego, CA (US); Hao Xu, San Diego, CA (US); Ravi Teja Sukhavasi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 14/743,825

(22) Filed: Jun. 18, 2015

(65) Prior Publication Data

US 2015/0373741 A1 Dec. 24, 2015

Related U.S. Application Data

(60) Provisional application No. 62/015,198, filed on Jun. 20, 2014.

(51) Int. Cl.
*H04W 24/08* (2009.01)
*H04W 74/08* (2009.01)

(52) U.S. Cl.
CPC ....... *H04W 24/08* (2013.01); *H04W 74/0808* (2013.01)

(58) Field of Classification Search
None
See application file for complete search history.

(56) References Cited

U.S. PATENT DOCUMENTS 7,113,806 B2   9/2006 Gray
2008/0084835 A1   4/2008 Goel et al.
(Continued)

FOREIGN PATENT DOCUMENTS

EP   1411675 A1   4/2004

OTHER PUBLICATIONS

International Search Report and Written Opinion—PCT/US2015/036822—ISA/EPO—Sep. 23, 2015.

*Primary Examiner* — Huy D Vu
*Assistant Examiner* — Bao G Nguyen
(74) *Attorney, Agent, or Firm* — Nerrie M. Zohn

(57) ABSTRACT

The present disclosure provides methods and apparatuses for multi-carrier transmissions over adjacent channels that reduce self-jamming due to asymmetric interference. In an aspect, a large bandwidth load-base equipment (LBE) carrier may be provided such that CCA is performed jointly over the entire bandwidth. In another aspect, additional CCA timeslots may be used to synchronize the two carriers. In a further aspect, an extended CCA may be performed on a primary unlicensed carrier while a simple CCA may be performed on a secondary unlicensed carrier. In yet another aspect, LBE may be deployed on some carriers while frame-base equipment (FBE) may be deployed on other carriers.

88 Claims, 22 Drawing Sheets

(56) References Cited

U.S. PATENT DOCUMENTS

2009/0129353 A1* 5/2009 Ki ................. H04W 74/0816
  370/338
2014/0031052 A1* 1/2014 Lagerqvist ............ H04W 72/10
  455/452.1

* cited by examiner

|  | TX 1 | TX 2 | TX 3 |
|---|---|---|---|
| 0 |  |  |  |
| 1 | ▨ |  |  |
| 2 | ▨ | ▨ |  |
| 3 | ▨ | ▨ |  |
| 4 | ▨ | ▨ | ▨ |
| 5 | ▨ | ▨ | ▨ |
| 6 | ▨ | ▨ | ▨ |
| 7 | ▨ | ▨ | ▨ |
| 8 |  |  |  |
| 9 |  |  |  |
| 10 |  |  |  |
| 11 |  |  |  |
| 12 |  | ▨ | ▨ |
| 13 |  | ▨ | ▨ |
| 14 |  |  |  |
| 15 |  |  |  |
| 16 |  |  |  |
| 17 |  | ▨ |  |
| 18 |  | ▨ | ▨ |
| 19 |  | ▨ |  |
| 20 | ▨ | ▨ | ▨ |
| 21 | ▨ | ▨ | ▨ |
| 22 | ▨ | ▨ | ▨ |
| 23 |  |  |  |
| 24 | ▨ | ▨ |  |
| 25 | ▨ | ▨ |  |
| 26 | ▨ | ▨ |  |
| 27 | ▨ | ▨ |  |

Unlicensed Carrier
507

FIG. 5B

METHOD AND APPARATUS FOR REDUCING SELF-JAMMING OF TRANSMISSIONS ON ADJACENT CARRIERS

CROSS-REFERENCE TO RELATED APPLICATION(S)

This application claims the benefit of U.S. Provisional Application Ser. No. 62/015,198, entitled "JOINT LBE FBE MULTI-CARRIER TRANSMISSION" and filed on Jun. 20, 2014, which is expressly incorporated by reference herein in its entirety.

FIELD

Aspects of the present disclosure relate generally to wireless communication systems, and more particularly, to multi-carrier transmissions over adjacent channels.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

The present disclosure provides methods and apparatuses for multi-carrier transmissions over adjacent channels that reduce self-jamming due to asymmetric interference. In an aspect, a large bandwidth load-based equipment (LBE) carrier may be provided such that CCA is performed jointly over the entire bandwidth. In another aspect, additional CCA timeslots may be used to synchronize the two carriers. In a further aspect, an extended CCA may be performed on a primary unlicensed carrier while a simple CCA may be performed on a secondary unlicensed carrier. In yet another aspect, LBE may be implemented on some carriers while frame-based equipment (FBE) may be implemented on other carriers.

In an aspect, an apparatus receives data for transmission over at least two unlicensed carriers, the at least two unlicensed carriers including a first unlicensed carrier and a second unlicensed carrier, performs an extended clear channel assessment (ECCA) countdown on the first unlicensed carrier, determines a potential last timeslot from one or more potential last timeslots of the ECCA countdown on the first unlicensed carrier, and performs a clear channel assessment (CCA) check on the second unlicensed carrier during the potential last timeslot.

In another aspect, the apparatus receives data for transmission over at least two unlicensed carriers, the at least two unlicensed carriers including a first unlicensed carrier and a second unlicensed carrier, performs an extended clear channel assessment (ECCA) countdown on each of the at least two unlicensed carriers, determines a potential last timeslot from one or more potential last timeslots of the ECCA countdown on the second unlicensed carrier, and performs a clear channel assessment (CCA) check on the first unlicensed carrier during the potential last timeslot.

In still another aspect, the apparatus receives data for transmission over at least two unlicensed carriers, the at least two unlicensed carriers including a first unlicensed carrier and a second unlicensed carrier, performs an extended clear channel assessment (ECCA) countdown on the first unlicensed carrier, determines whether a potential last timeslot of the ECCA countdown on the first unlicensed carrier occurs past a threshold timeslot of the second unlicensed carrier, and decides whether to perform a clear channel assessment (CCA) check on the second unlicensed carrier based on the determination.

In a further aspect, the apparatus receives data for transmission over at least two unlicensed carriers, the at least two unlicensed carriers including a first unlicensed carrier and a second unlicensed carrier, performs an extended clear channel assessment (ECCA) countdown on the first unlicensed carrier and the second unlicensed carrier, enters a deferral state on one or more of the first unlicensed carrier or the second unlicensed carrier, performs an initial clear channel assessment (ICCA) on the one or more of the first unlicensed carrier or the second unlicensed carrier at an end of the deferral state, and transmits the data on the one or more of the first unlicensed carrier or the second unlicensed carrier if the ICCA clears.

In still another aspect, the apparatus receives data for transmission over at least two unlicensed carriers, performs an extended clear channel assessment (ECCA) countdown on a first of the at least two unlicensed carriers, determines a timeslot in which the ECCA countdown of the first unlicensed carrier ends, performs a clear channel assessment (CCA) check of both the first and a second of the least two unlicensed carriers during the determined timeslot, and transmits the data on any of the first and the second of the at least two unlicensed carrier when the CCA check is clear.

BRIEF DESCRIPTION OF THE DRAWINGS

FIG. 5B is a block diagram illustrating a sequence of 28 (0-27) transmission slots for an unlicensed carrier in a synchronized, load based LTE-U communication system.

DETAILED DESCRIPTION

Figure 1:
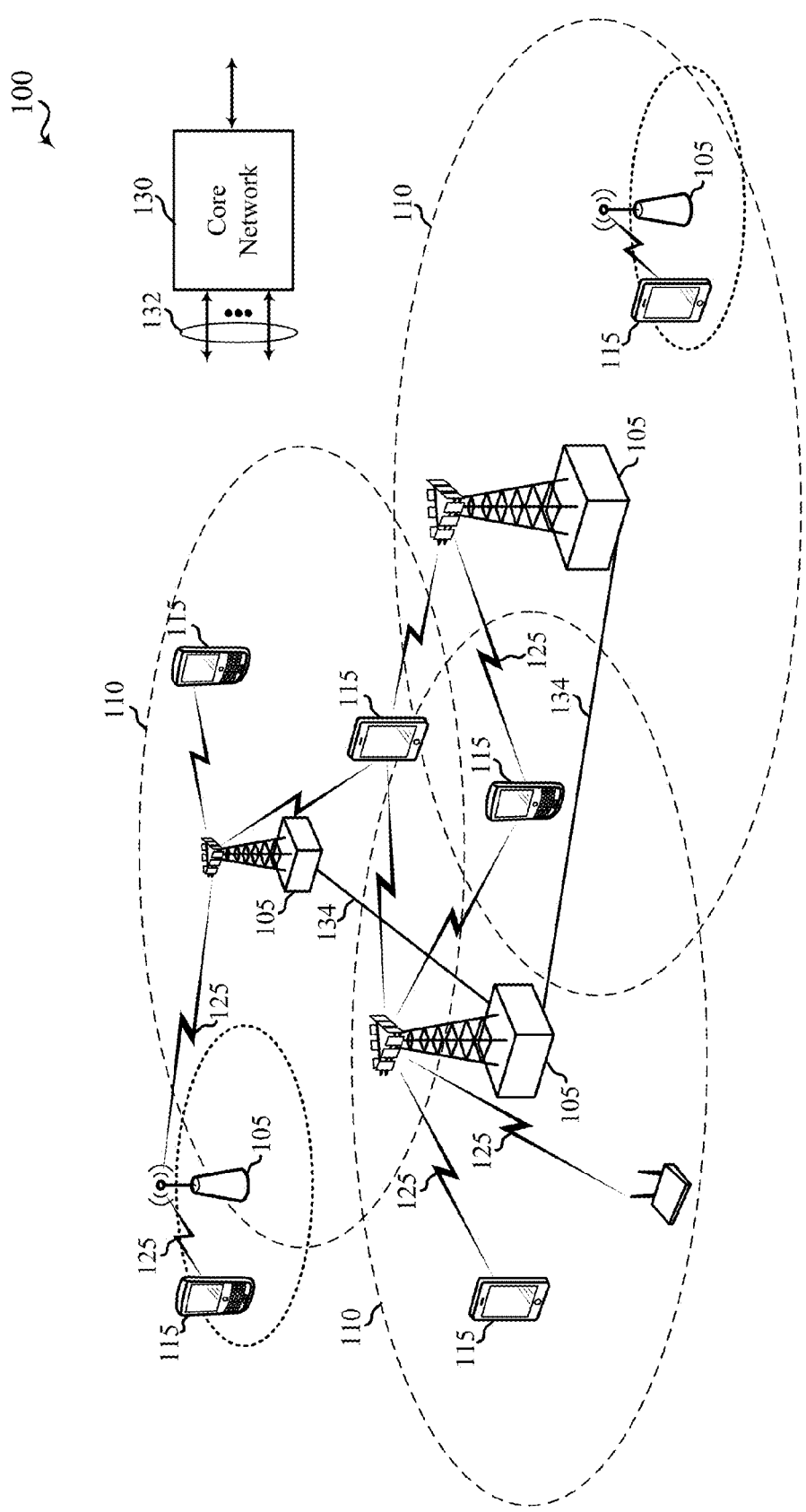
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum (LTE-U) may be compatible with carrier-grade WiFi, making LTE-U an alternative to WiFi. LTE-U may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE-U may perform significantly better than WiFi. For example, an all LTE-U deployment (for single or multiple operators) compared to an all WiFi deployment, or when there are dense small cell deployments, LTE-U may perform significantly better than WiFi. LTE-U may perform better than WiFi in other scenarios such as when LTE-U is mixed with WiFi (for single or multiple operators).

For a single service provider (SP), an LTE-U network may be configured to be synchronous with a LTE network on the licensed spectrum. However, LTE-U networks deployed on a given channel by multiple SPs may be configured to be synchronous across the multiple SPs. One approach to incorporate both the above features may involve using a constant timing offset between LTE/LTE-A networks without unlicensed spectrum and LTE-U networks with unlicensed spectrum for a given SP. An LTE-U network may provide unicast and/or multicast services according to the needs of the SP. Moreover, an LTE-U network may operate in a bootstrapped mode in which LTE cells act as anchor and provide relevant cell information (e.g., radio frame timing, common channel configuration, system frame number or SFN, etc.) for LTE-U cells. In this mode, there may be close interworking between LTE/LTE-A without unlicensed spectrum and LTE-U with unlicensed spectrum. For example, the bootstrapped mode may support the supplemental downlink and the carrier aggregation modes described above. The PHY-MAC layers of the LTE-U network may operate in a standalone mode in which the LTE-U network operates independently from an LTE network without unlicensed spectrum. In this case, there may be a loose interworking between LTE without unlicensed spectrum and LTE-U based on RLC-level aggregation with co-located LTE/LTE-U with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-U network that supports one or more unlicensed spectrum modes of operation or deployment scenarios. In other embodiments, the system 100 may support wireless communications using an unlicensed spectrum and an access technology different from LTE/LTE-U with unlicensed spectrum, or a licensed spectrum and an access technology different from LTE/LTE-U. The terms evolved Node B (eNB) and user equipment (UE) may be generally used to describe the base stations 105 and devices 115, respectively. The system 100 may be a Heterogeneous LTE/LTE-U network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE-U), or both (LTE/LTE-U with/without unlicensed spectrum). Similarly, the uplink transmissions may be made using a licensed spectrum (e.g., LTE), an unlicensed spectrum (e.g., LTE-U), or both (LTE/LTE-U with/without unlicensed spectrum).

In some embodiments of the system 100, various deployment scenarios for LTE-U may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE-U deployment scenarios or modes of operation in a system such as the system 100, as well as other features and functions related to the operation of LTE-U, are provided below with reference to FIGS. 2A to 14.

Figure 2A:
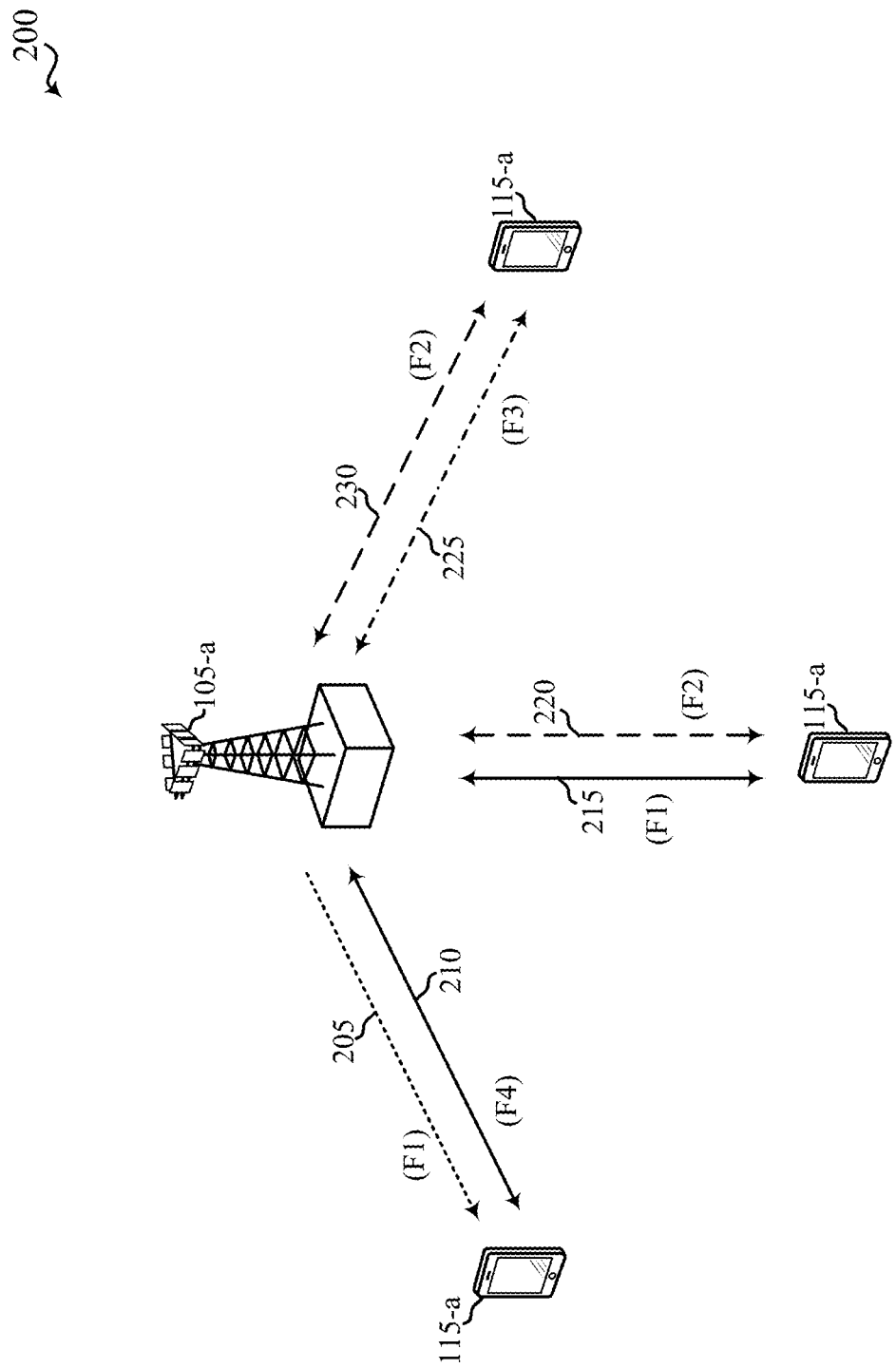
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE-U. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-U with or without unlicensed spectrum for capacity offload.

As described above, the typical service provider that may benefit from the capacity offload offered by using LTE-U is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE-U may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE-U with (e.g., bidirectional links 215 and 225). The carrier aggregation mechanisms supported when using LTE-U may fall under a hybrid frequency division duplexing-time division duplexing (FDD-TDD) carrier aggregation or a TDD-TDD carrier aggregation with different symmetry across component carriers.

Figure 2B:
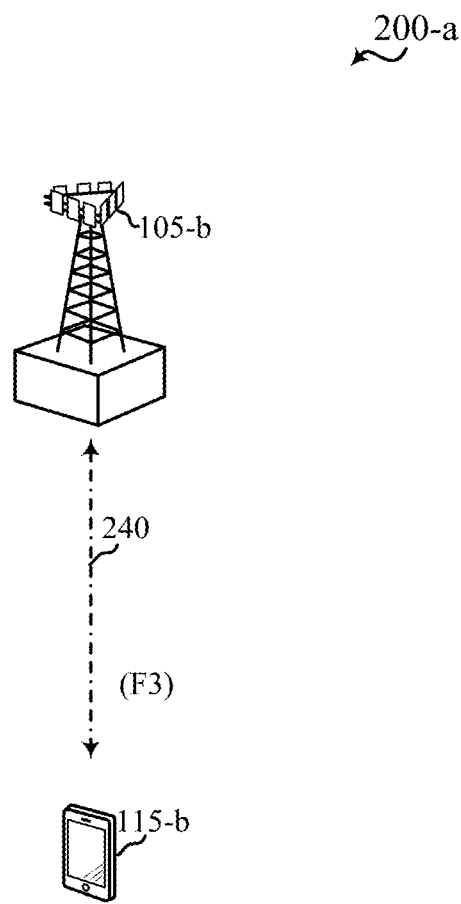
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE-U. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
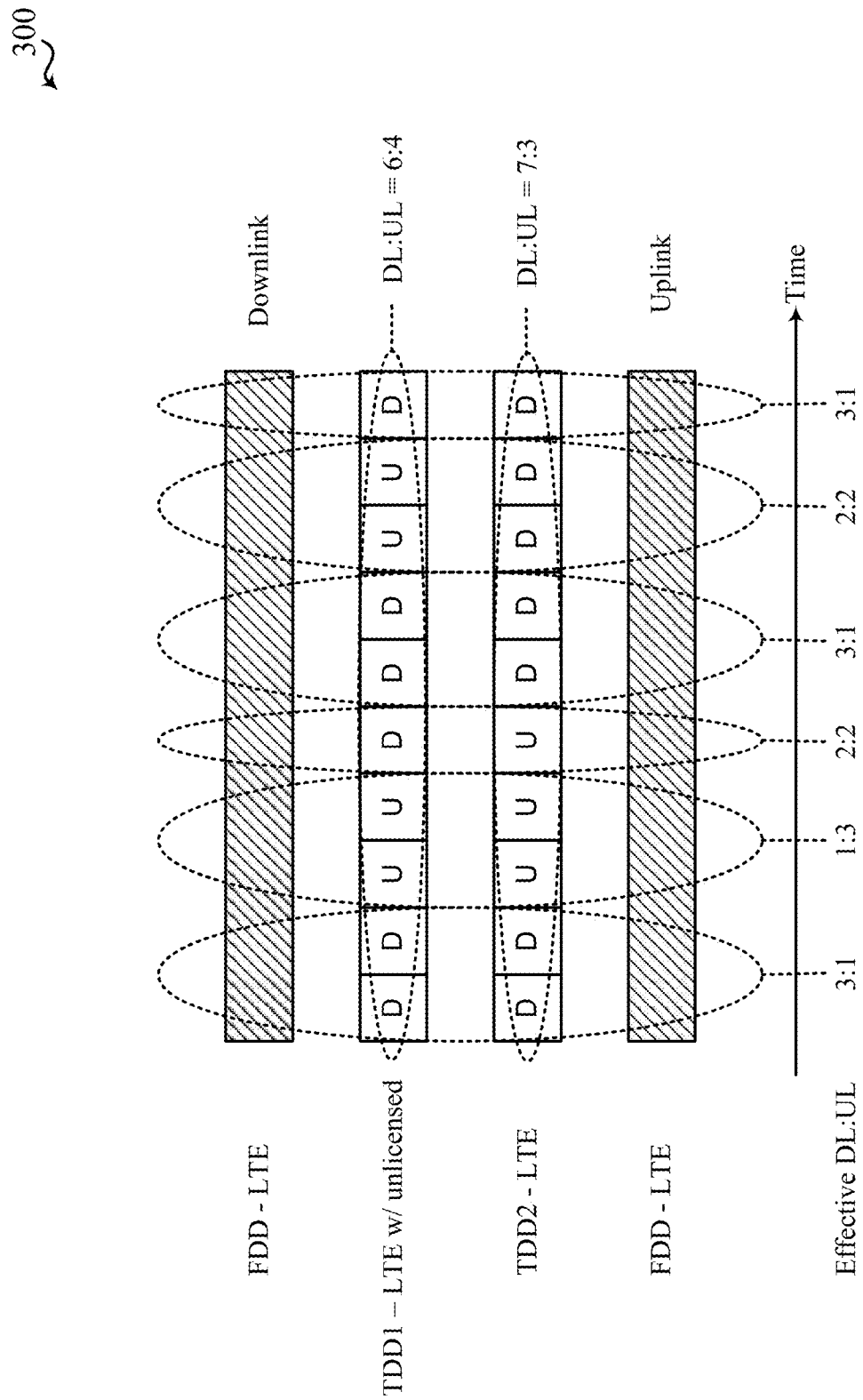
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE-U, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-U with or without unlicensed spectrum.

Figure 4:
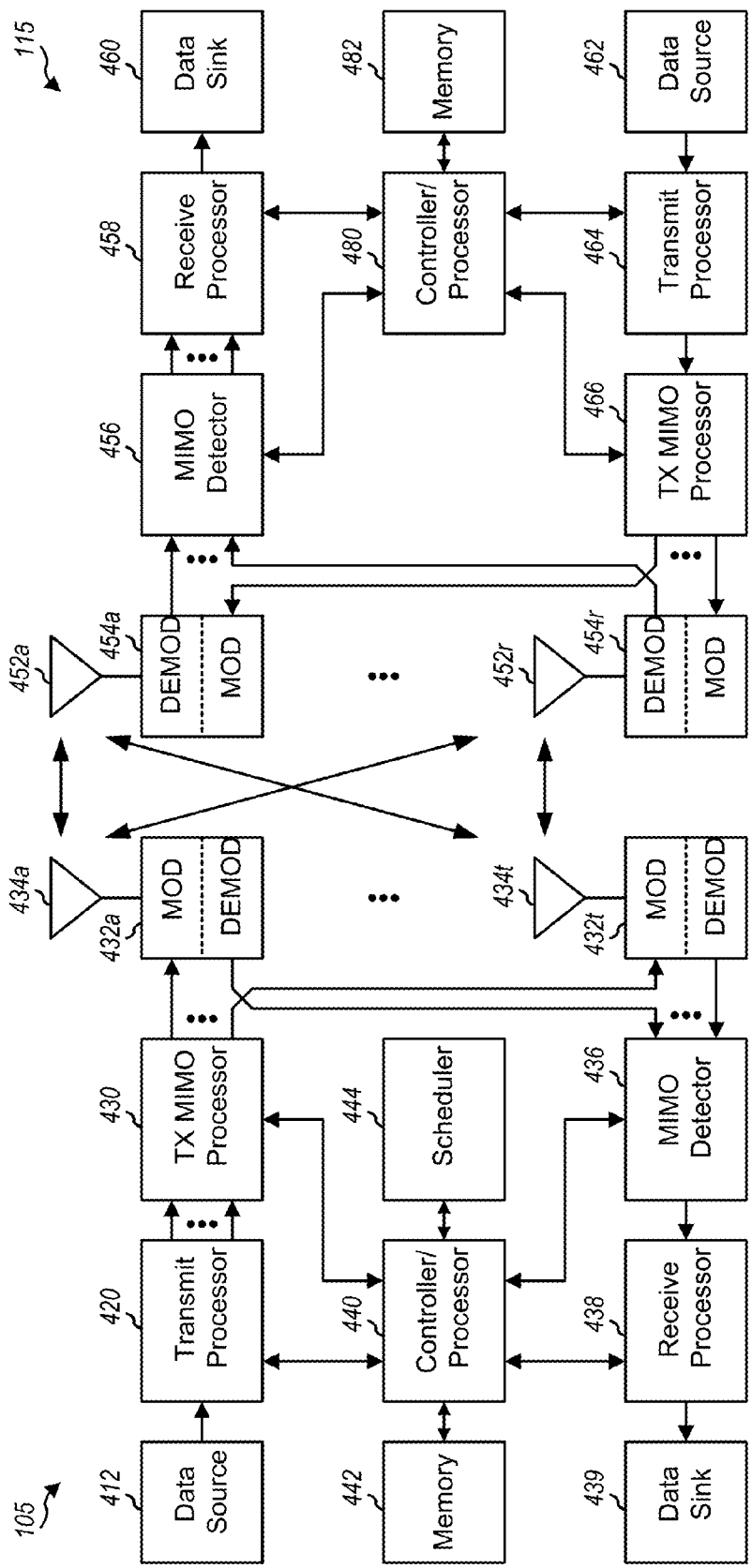
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 11-15, and/or other processes for the techniques described herein. The memories 442 and 482 may store data and program codes for the eNB 105 and the UE 115, respectively. A scheduler 444 may schedule UEs for data transmission on the downlink and/or uplink.

Initially contemplated configurations of LTE-U networks using unlicensed spectrum provide for access of the unlicensed spectrum using a frame-based structure. Frame-based designs for LTE-U offer many advantages, including common design elements shared with standard LTE systems that use licensed spectrum. However, frame-based LTE-U may have some fundamental issues when co-existing with a load-based system. Frame-based systems perform CCA checks at a fixed time during the frame, where the fixed time is usually a small fraction of the frame (typically around 5%). For example, in a frame-based system, CCA checks may occur in the special subframes in one of seven symbols after the guard period of the special subframe. When a load-based system occupies a channel, transmission gaps occurring between transmission bursts of the load-based system are unlikely to fall into the CCA period of a frame-based system. Load-based systems generally capture the channel until buffer is exhausted.

Figure 5A:
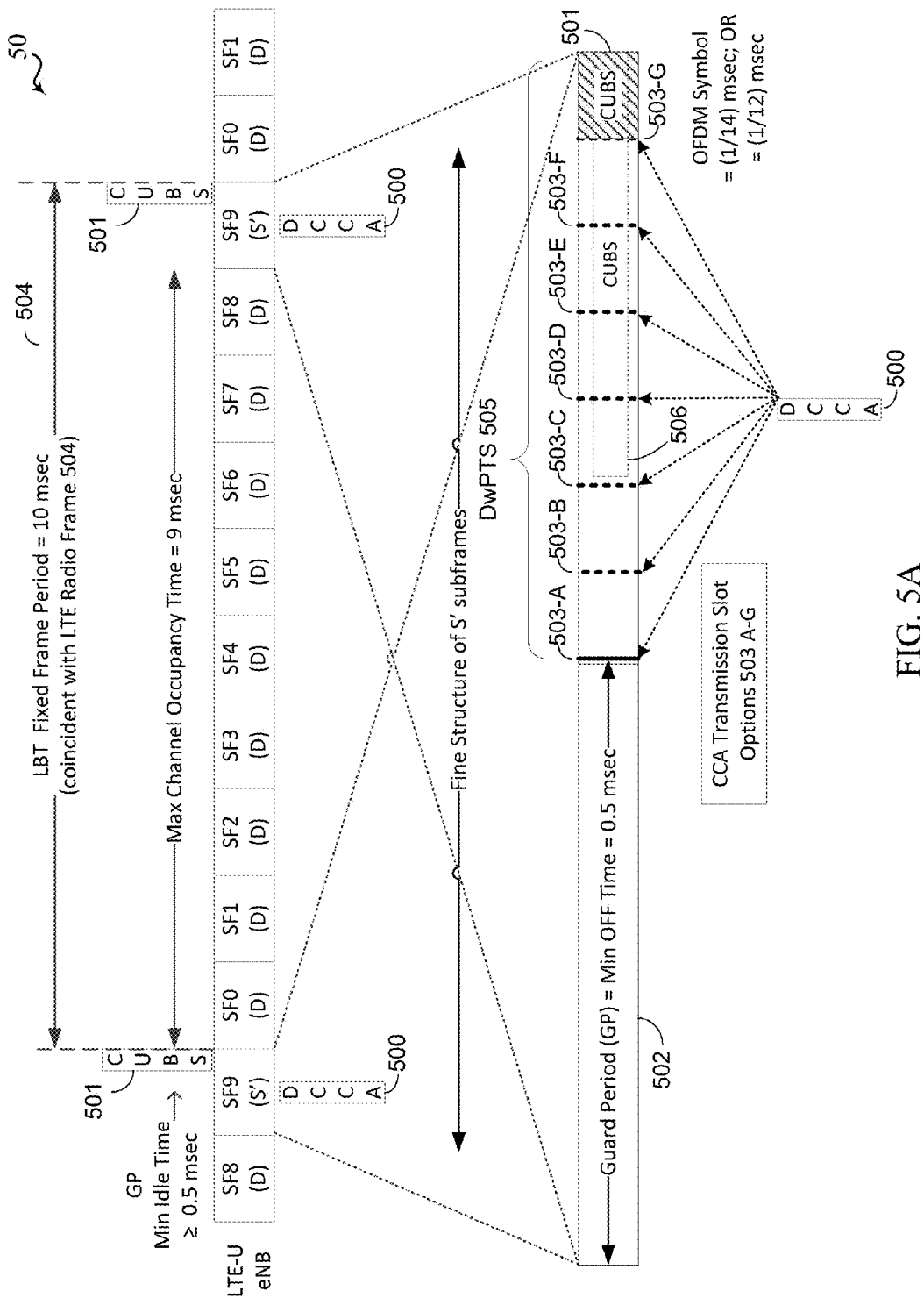
FIG. 5A is a block diagram illustrating a transmission stream in a synchronized, frame based LTE-U communication system.

FIG. 5A is a block diagram illustrating transmission stream 50 in a synchronized, frame based LTE-U communication system. Transmission stream 50 is divided into LTE radio frames, such as LTE radio frame 504, each of such radio frame further divided into 10 subframes (subframes 0-9) that may be configured for uplink communication (U), downlink communications (D), or a special subframe (S') which includes a uplink pilot time slot (UpPTS) (not shown) that may include uplink communications, a guard period, such as guard period 502, and a downlink pilot time slot (DwPTS) 507 that may include downlink communications. Prior to initiating communications on an unlicensed carrier, the transmitter originating transmission stream 50 transmits downlink CCA (DCCA) 500 in one of the fixed seven possible transmission slots, CCA opportunities 503-A to 503-G. If the transmitter detects a clear CCA, then the unlicensed channel is occupied by channel usage beacon signal (CUBS) 501 prior to any actual data transmissions from the transmitter. Once a CCA has been conducted, the transmitter will not be required to perform another CCA check for a fixed period of 10 ms, which is incident to the radio frame length, such as LTE radio frame 504.

The main function of CUBS in communication systems employing LBT procedures is to reserve the channel. A CUBS is generally a wideband signal with frequency reuse that carries at least the transmitter and/or receiver identify (e.g., cell identifier (ID) or PLMN for a base station and a cell radio network temporary identifier (C-RNTI) for a UE or mobile device). The transmit power for CUBS may also be linked to a CCA threshold. Additionally, CUBS may be used to help setting automatic gain control (AGC) at the receiver. From these perspectives, any signal spanning 80% of channel bandwidth could be sufficient. A third function of the CUBS provides notice to the receiver that the CCA check succeeded. With this information, a receiver can expect data transmissions from the transmitter.

When competing deployments are in the vicinity of the transmitter originating transmission stream 50, the transmitter will be assigned one of CCA opportunities 503-A to 503-G, while the competing deployments may be assigned others of the CCA opportunities 503-A to 503-G. It is likely that the deployment assigned for CCA in an earlier one of CCA opportunities 503-A to 503-G may detect a clear CCA and begin CUBS transmission before the competing deployment attempts CCA. The subsequent CCA attempt will then fail through detection of the CUBS transmission. For example, in an alternate aspect illustrated in FIG. 5A, the transmitter is assigned CCA opportunity 503-C for the CCA check. The transmitter detects a clear CCA and immediately begins transmitting CUBS 506. Any competing deployments assigned to any of CCA opportunities 503-D to 503-G will detect CUBS 506 and their respective CCA checks will fail.

Various aspects of the present disclosure would provide for LTE-U networks with unlicensed spectrum designed as a load-based system. A load-based design may then take advantage of the random gaps created by another load-based system in order to more-efficiently engage in data transmissions over the unlicensed spectrum. One of the actions taken to implement such a load-based LTE-U network is to synchronize the nodes in a particular public land mobile number (PLMN) when each of these nodes contends for a vacant channel at random times. Synchronization of nodes within the same PLMN is also an advantage when competing with other unlicensed spectrum technologies, such as WiFi, 802.11, 802.15, and the like. However, these other unlicensed spectrum technologies tend to decrease in reuse factor when node density increases.

It should be noted that, in implementing a load-based LTE-U network, a challenge is fitting a finer timing granularity into the existing LTE numerology. For example, LTE has a 71.4 µs OFDM symbol numerology. This OFDM symbol numerology would need to be adapted into a more constricted CCA window.

FIG. 5B is a block diagram illustrating a sequence of 28 (0-27) transmission slots for an unlicensed carrier 505 in a synchronized, load based LTE-U communication system. Unlicensed carrier 505 is shared by three transmitters, TXs 1-3. The transmitters, TXs 1-3, may be transmitters located within a base station or eNB, or may be located within a mobile device or UE. In a load based LBT transmission system, transmitters attempt to capture the channel and transmit buffer data when the data is stored into the buffer, instead of waiting for the fixed CCA opportunity in a frame based system. In one example of operation illustrated in FIG. 5B, at slot 1, TX 1 receives data in its buffer and performs an LBT procedure to capture unlicensed carrier 505. After the successful LBT procedure, TX 1 begins its transmission burst at slot 1 and continues transmission until slot 7. At slot 2, TX 2 receives data in its buffer and attempts to capture unlicensed carrier 505. However, because TX 1 is already transmitting on unlicensed carrier 505, TX 2 is blocked from transmissions until the channel is again clear. Similarly, at slot 4, TX 3 is ready to begin transmissions and attempts to capture unlicensed carrier 505, but is blocked from transmissions until the channel is again clear.

At slot 12, both TXs 2 and 3 attempt to capture unlicensed carrier 505 for transmission of buffer data. Because unlicensed carrier 505 is clear at slot 12, both of TXs 2 and 3 begin data transmission at slot 12 through slot 13.

At slot 17, TX 2 is ready to transmit buffer data again and attempts to capture unlicensed carrier 505. With no other transmissions detected, TX 2 begins transmitting data at slot 17 until slot 22. At slot 18, TX 3 receives buffer data and is ready to transmit. TX 3 attempts to capture unlicensed carrier 505, but, because of the transmissions from TX 2, the LBT fails, thus, blocking TX 3 from transmission until the channel is again clear. Similarly, TX 1 is ready to begin transmission at slot 20. However, TX 1 will also be blocked from transmitting on unlicensed carrier 505 until the channel is again clear.

Once unlicensed carrier 505 is again clear at slot 23, TX 1 is ready to re-attempt capture of unlicensed carrier 505. TX 2 also receives data and is ready to transmit again at slot 24. TX 2 also attempts to capture unlicensed carrier 505 for transmission. Because there are no other transmission occurring on unlicensed carrier 505 detected by either TX 1 or TX 2, both TXs 1 and 2 begin transmission at slot 24 and continue through slot 27. As illustrated, each of TXs 1-3 attempt transmission according to their loading.

Figure 6A:
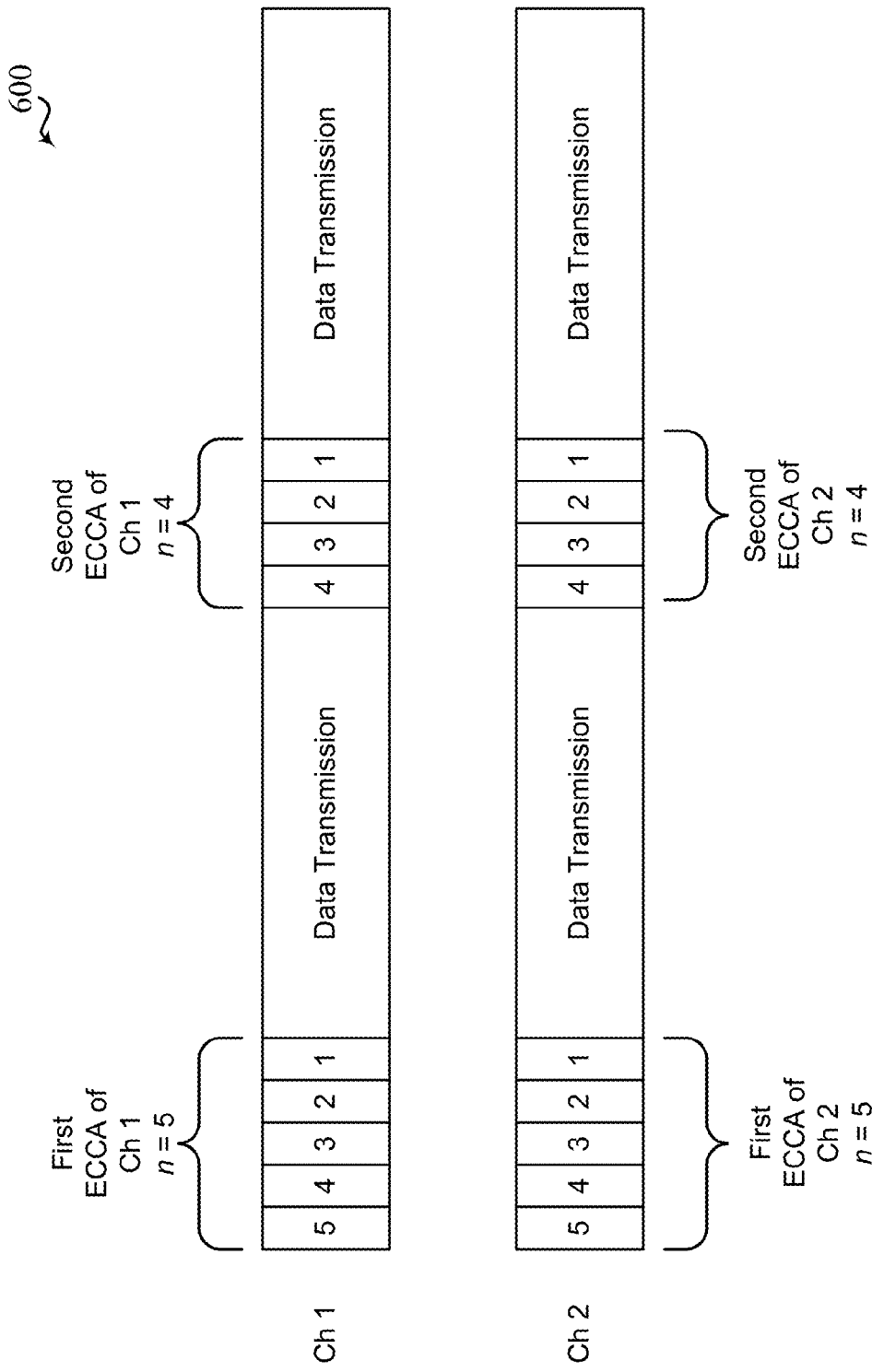
FIG. 6A is a diagram illustrating ECCA countdowns on two channels with no interference.

FIG. 6A is a diagram 600 illustrating a load based listen before talk (LBT) procedure in which a first extended CCA (ECCA) countdown of n=5 and a second ECCA countdown of n=4 are performed by a transmitter on two unlicensed carriers (channel 1 and channel 2) not experiencing interference. In an ECCA countdown, the unlicensed carrier is observed for a factor of n timeslots multiplied by the CCA observation time prior to transmission. For example, n defines the number of clear idle slots that need to be observed prior to transmission. In an aspect, a counter can be decremented each time a timeslot in the ECCA countdown is deemed to be unoccupied (e.g., the energy level detected by the transmitter during each of the CCA slots is less than a threshold indicating that the channel is clear). When the counter reaches zero, transmission can occur. For example, referring to FIG. 5B, when one of the transmitters TXs 1-3 attempts to capture unlicensed carrier 505 for transmission in an ECCA scenario, a predetermined number of n timeslots would need to be clear before transmission can occur. By way of example, referring again to FIG. 5B, if n=4 and the ECCA countdown for TX 2 begins in timeslot 8, then timeslots 8-11 will need to be clear before TX 2 can capture unlicensed carrier 505 and begin transmission in timeslot 12.

Figure 6B:
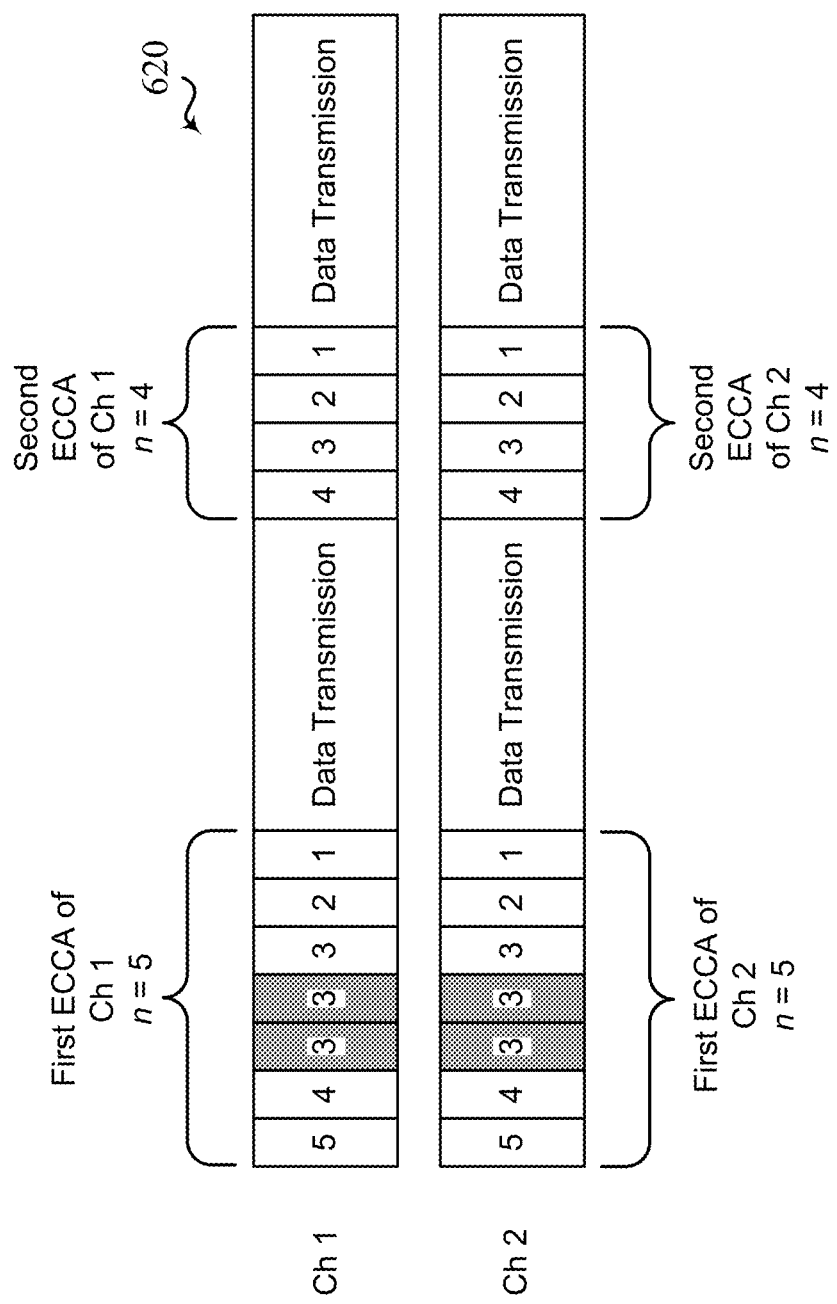
FIG. 6B is a diagram illustrating ECCA countdowns on two channels with symmetric interference.

FIG. 6B is a diagram 620 illustrating a load based listen before talk (LBT) procedure in which a first ECCA countdown of n=5 and a second ECCA countdown of n=4 are performed by a transmitter on two unlicensed carriers (e.g., channel 1 and channel 2) experiencing symmetric interference. For example, the symmetric interference can be caused by WiFi beacons and management frames on the primary 20 MHz channel, bandwidth switching between 20 MHz, 40 MHz, and 80 MHz for control and data packets, and/or interferers using a subset of carriers in close vicinity to the transmitter.

In FIG. 6B, because channel 1 and channel 2 experience the same interference during the third and fourth timeslots of the ECCA countdown, the synchronization of their respective ECCA countdowns remains intact because both channel 1 and channel 2 operate in sync with each throughout the duration of the ECCA countdown. In other words, the counter reaches zero for both channel 1 and channel 2 during the seventh timeslot. Accordingly, a transmitter may reach the end of the ECCA countdown for each channel at the same time, and subsequently transmit data on each channel successfully.

Figure 6C:
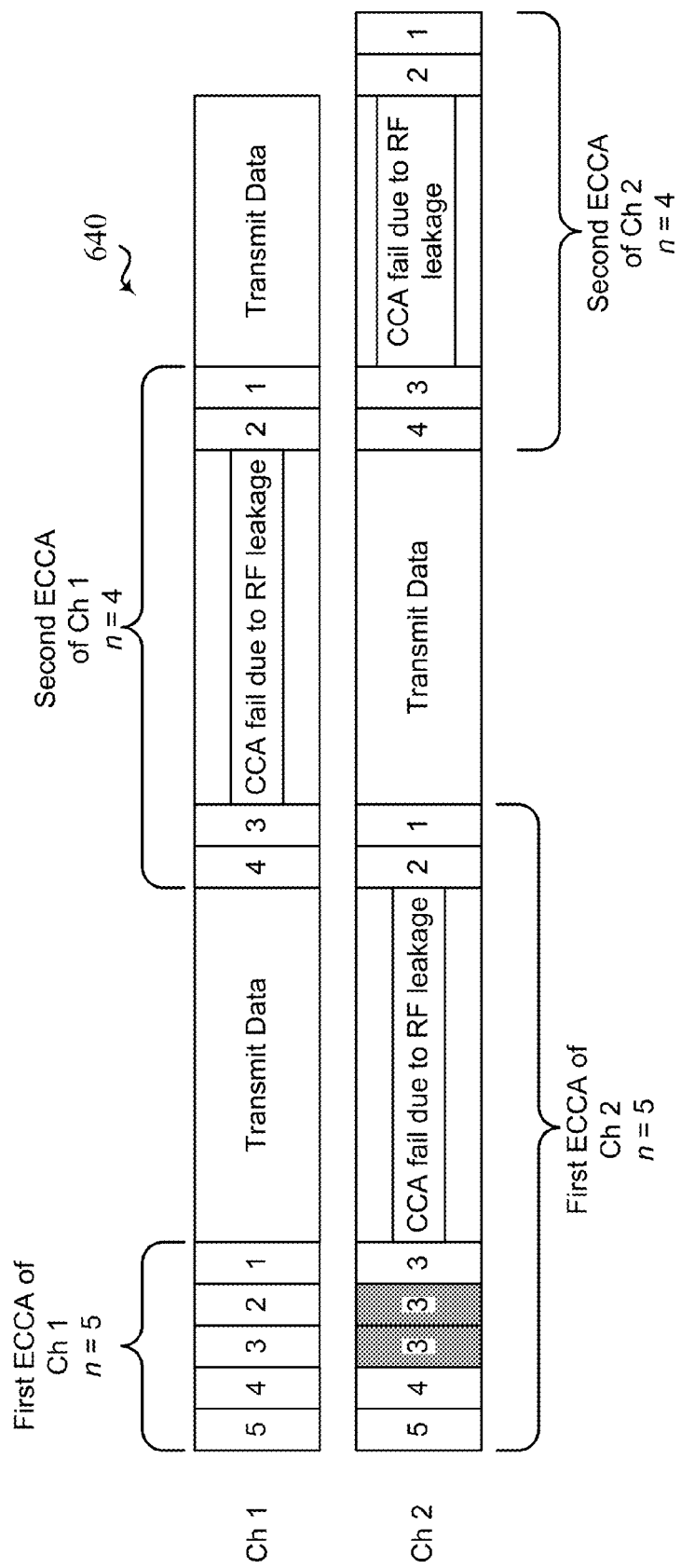
FIG. 6C is a diagram illustrating ECCA countdowns on two channels with asymmetric interference.

FIG. 6C is a diagram 640 illustrating a load based listen before talk (LBT) procedure in which a first ECCA countdown of n=5 and a second ECCA countdown of n=4 are performed by a transmitter on two unlicensed carriers (e.g., channel 1 and channel 2) experiencing asymmetric interference. For example, the asymmetric interference can be caused by WiFi beacons and management frames on the primary 20 MHz channel, bandwidth switching between 20 MHz, 40 MHz, and 80 MHz for control and data packets, and/or interferers using a subset of carriers in close vicinity to the transmitter.

In FIG. 6C, channel 1 does not experience the interference experienced by channel 2. Therefore the first ECCA countdown of channel 1 does not stall since 5 consecutive timeslots do not experience interference. Thus, when the transmitter reaches the end of the first ECCA countdown for channel 1 (e.g., the fifth timeslot), the transmitter may transmit data on channel 1. However, when the transmitter reaches the end of the first ECCA countdown for channel 1, the first ECCA countdown on channel 2 has not yet concluded because of the interference experienced during the third and fourth timeslots of the first ECCA countdown on channel 2. Accordingly, during the time when the transmitter transmits the data on channel 1, the transmitter concurrently self-jams channel 2 because of RF leakage from channel 1 into channel 2. The RF leakage from channel 1 into channel 2 causes the first ECCA countdown on channel 2 to fail. Later in time, when the data on channel 1 is no longer transmitted, the transmitter may resume the first ECCA countdown on channel 2, continuing from a previously-used countdown number (e.g., the sixth timeslot which is labeled "2"). When the first ECCA countdown for channel 2 finally reaches the end (e.g., the seventh timeslot which is labeled "1"), the transmitter may transmit the data on channel 2. However, at this time, the second ECCA countdown for channel 1 is no longer synchronized with the second ECCA countdown for channel 2. Accordingly, during the time when the transmitter transmits the data on channel 2, the transmitter concurrently self-jams channel 1 because of RF leakage from channel 2 into channel 1. The RF leakage from channel 2 into channel 1 then causes the second ECCA countdown on channel 1 to stall. The process may continue to repeat between channel 1 and channel 2 as long as the ECCA countdowns on the two channels are not synchronized.

In an aspect, the re-synchronization between the two carriers may be feasible when data transmission on one of the active carriers is complete and a buffer is empty and a ECCA countdown (n value) of the carriers is such that the CCA on all carriers ends at the same time. However, the probability of this occurring may be low especially when more than two adjacent carriers are involved. In an aspect, for N active adjacent carriers, the impact of self-jamming may be defined by a throughput loss upper bounded by $(1-1/N)*100\%$ and lower bounded by $(1/N)*100\%$. Accordingly, when two adjacent carriers are used, the impact may be approximately 50% throughput loss.

The present disclosure provides methods and apparatuses for multi-carrier transmissions over adjacent channels that reduce self-jamming due to asymmetric interference. In an aspect, a large bandwidth LBE carrier may be provided such that CCA is performed jointly over the entire bandwidth. In another aspect, additional CCA timeslots may be used to synchronize the two carriers. In a further aspect, an extended CCA may be performed on a primary unlicensed carrier while a simple CCA may be performed on a secondary unlicensed carrier. In yet another aspect, LBE may be implemented on some carriers while FBE may be implemented on other carriers.

Figure 7:
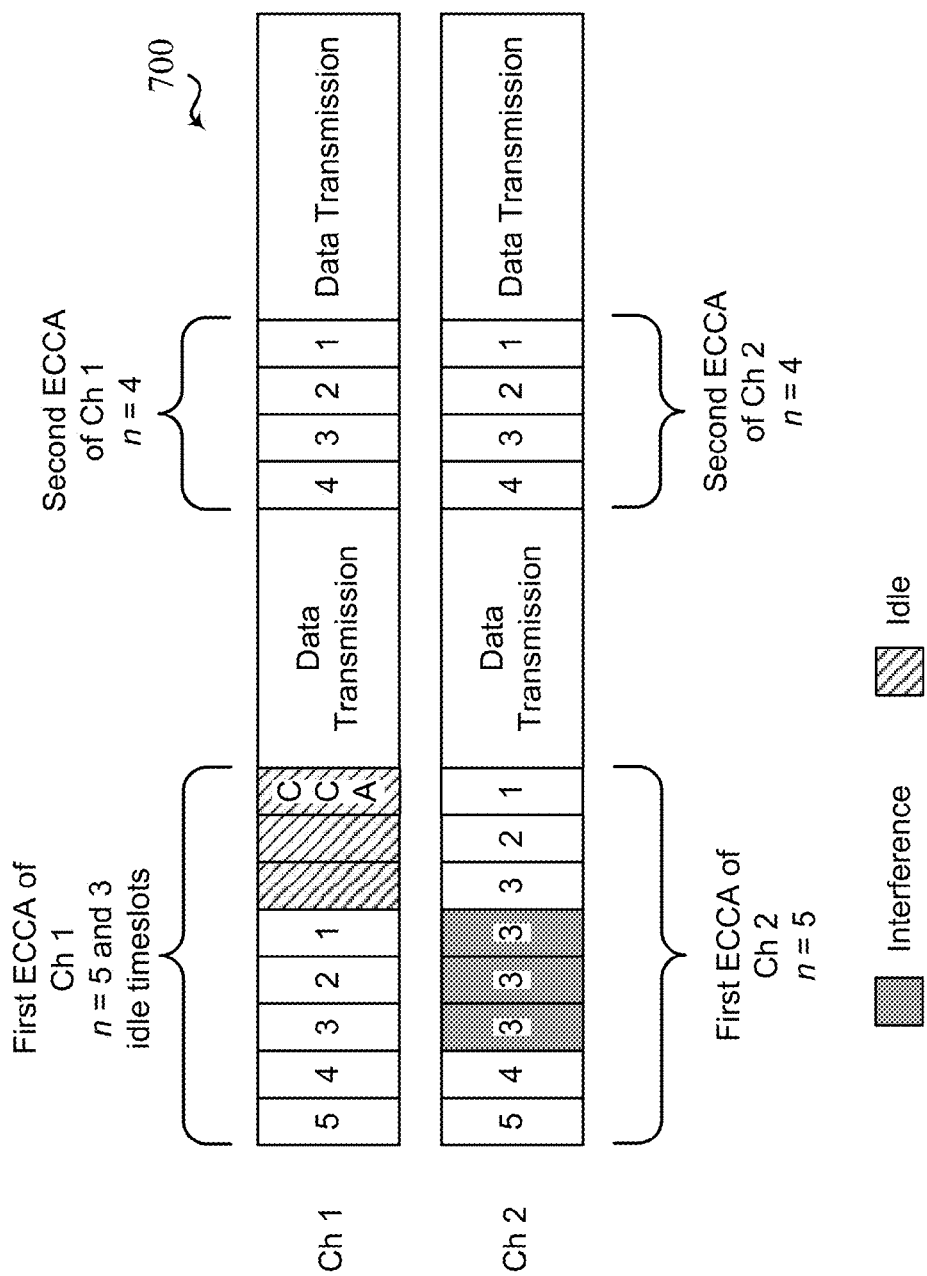
FIG. 7 is a diagram illustrating a multi-carrier transmission over adjacent channels where all channels are LBE carriers.

FIG. 7 is a diagram 700 illustrating a load based listen before talk (LBT) procedure in which an ECCA countdown of n=5 and a second ECCA countdown of n=4 is performed by a transmitter on two unlicensed carriers (e.g., channel 1 and channel 2) experiencing asymmetric interference. In FIG. 7, some carriers (e.g., channel 1) may be idle for a few extra timeslots to let other carriers (e.g., channel 2) "catch up" when the other carriers (e.g., channel 2) experience interference. This may be equivalent to idle time control. For example, after transmitting data on a channel, the transmitter can release the channel and enter an idle time control prior to performing the next ECCA countdown to ensure that the channel is idle before applying traffic. In an aspect, the idle time control can have a predetermined duration, e.g., at least 5% of the carrier occupancy during which the transmitter occupies the channel during a transmission. The idle extra timeslots in FIG. 7 may be similar to the idle time control. When a last timeslot in the ECCA countdown is reached for the lagging carrier (e.g., channel 2), the transmitter may perform a CCA on the idle carrier (channel 1) and begin transmitting on both channels if the CCA on both channel 1 and channel 2 clears. If the CCA performed on channel 1 does not clear and the CCA of channel 2 does clear, then the transmitter can choose to transmit on channel 2 or remain idle for a few timeslots to wait for channel 1 to "catch up", and then transmit on both channels assuming the next CCA on channel 2 clears. Similarly, if the CCA of channel 1 clears but the CCA of channel 2 does not clear, then the transmitter can choose to transmit on channel 1 or remain idle for a few additional timeslots on channel 1 to wait for channel 2 to catch up. For example, the CCA clears when the energy level detected during each of the timeslots in the ECCA is less than a threshold indicating that the channel is clear.

In an aspect, the transmitter may set a threshold on a maximum number of timeslots to remain idle. The threshold can vary based on eNB learning and history. The transmitter may then transmit if the number of idle timeslots reaches the threshold.

In another aspect, the transmitter may track a duty cycle for ECCA, wherein Duty Cycle=(Idle time waiting for other carrier's ECCA)/(Total time spent on ECCA+Idle time waiting for other carrier's ECCA). If the duty cycle exceeds a selected threshold, then the transmitter may ignore the other carrier and begin transmitting on the idle carrier. Re-synchronization may occur at a next radio frame boundary or after a pre-defined asynchronization duration.

In an aspect, an eNB can learn and optimize a number of idle timeslots, a duty cycle threshold, and/or an asynchronization duration based on several metrics. For example, the number of idle timeslots can include the number of timeslots past the end of the ECCA timeslots that the idle carrier (e.g., channel 1) is idle. The duty cycle threshold can be used by the transmitter to determine if data can be transmitted on the idle carrier regardless of the lagging carrier. The asynchronization duration can be the duration or number of timeslots the two carriers are not synchronized due to interference on one of the carriers. For example, the metrics may include a current timeslot difference between carriers (e.g., channel 1 and channel 2), throughput and delay needs, activity of interferers within CCA clearance range, bandwidth of interference monitoring (e.g., symmetric or asymmetric interference on all channels), and probability of losing a channel due to additional waiting time.

Figure 8:
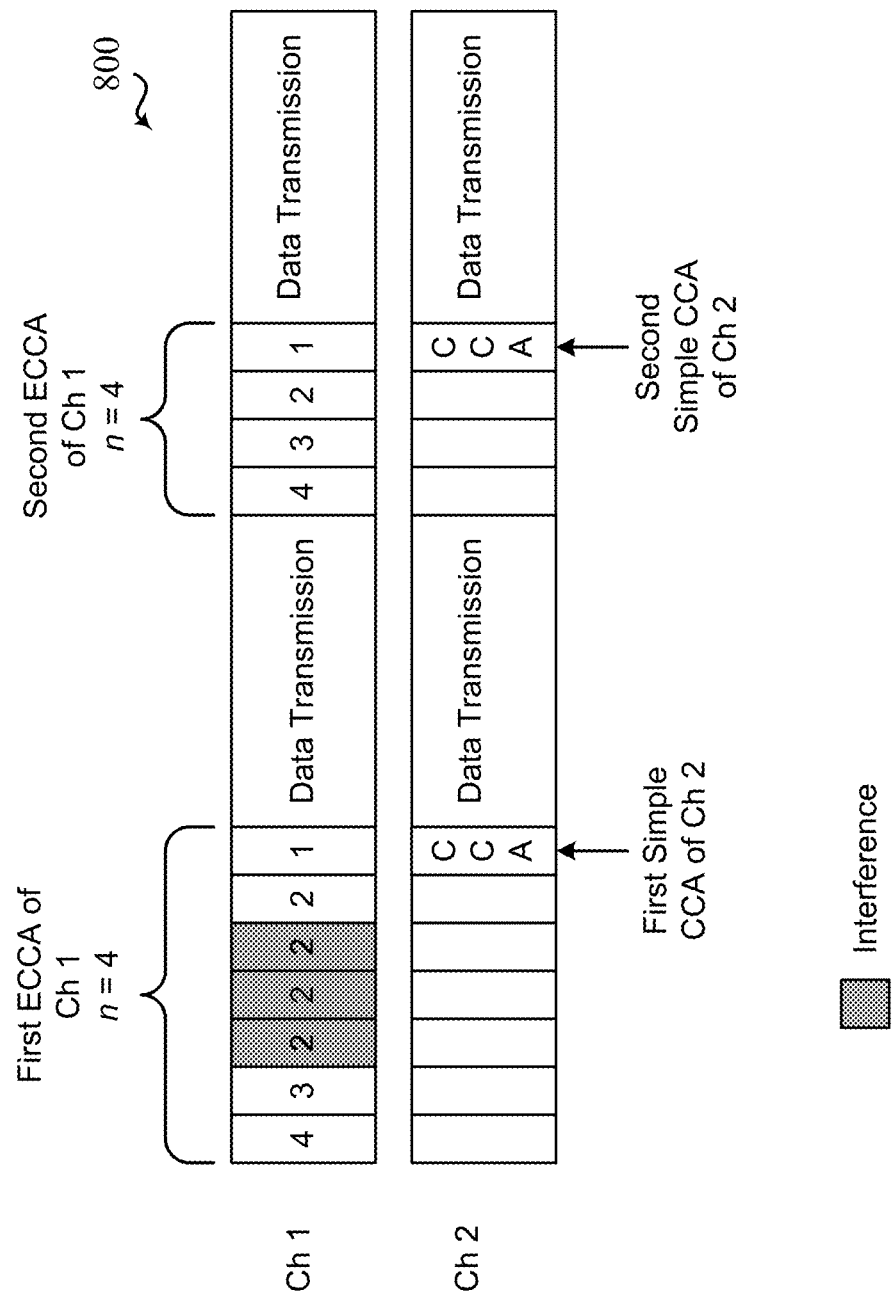
FIG. 8 is a diagram illustrating a multi-carrier transmission over adjacent channels where an extended CCA is used on a primary channel and a simple CCA is used on a secondary channel.

FIG. 8 is a diagram 800 illustrating a multi-carrier transmission procedure in which both of the first and second ECCA countdowns are of n=4 and are performed by a transmitter in a primary channel and a simple CCA is performed on a secondary channel.

Referring to FIG. 8, all carriers may be classified into two groups. For example, Group 1 may include ECCA channels (e.g., channel 1) and Group 2 may include simple CCA channels (e.g., channel 2). A transmitter may perform CCA on channels in Group 2 at a time slot right before the transmitter begins transmission on channels in Group 1. This ensures no self-jamming. If Group 1 has multiple channels, then the operation described above with respect to FIG. 7 can be used to synchronize the channels within the group.

If the CCA performed in the timeslot labeled "1" in channel 1 fails, then transmission does not occur on either channel 1 or channel 2. Instead, the transmitter waits until the next instance when the CCA clears in both channel 1 and channel 2 before transmitting data.

Alternatively, when a last ECCA timeslot is reached for the lagging carrier (channel 1), the transmitter may perform a CCA on the lagging carrier (channel 1) and the other carriers (e.g., channel 2) and begin transmitting on any or both of the carriers if the respective CCA clears.

Figure 9:
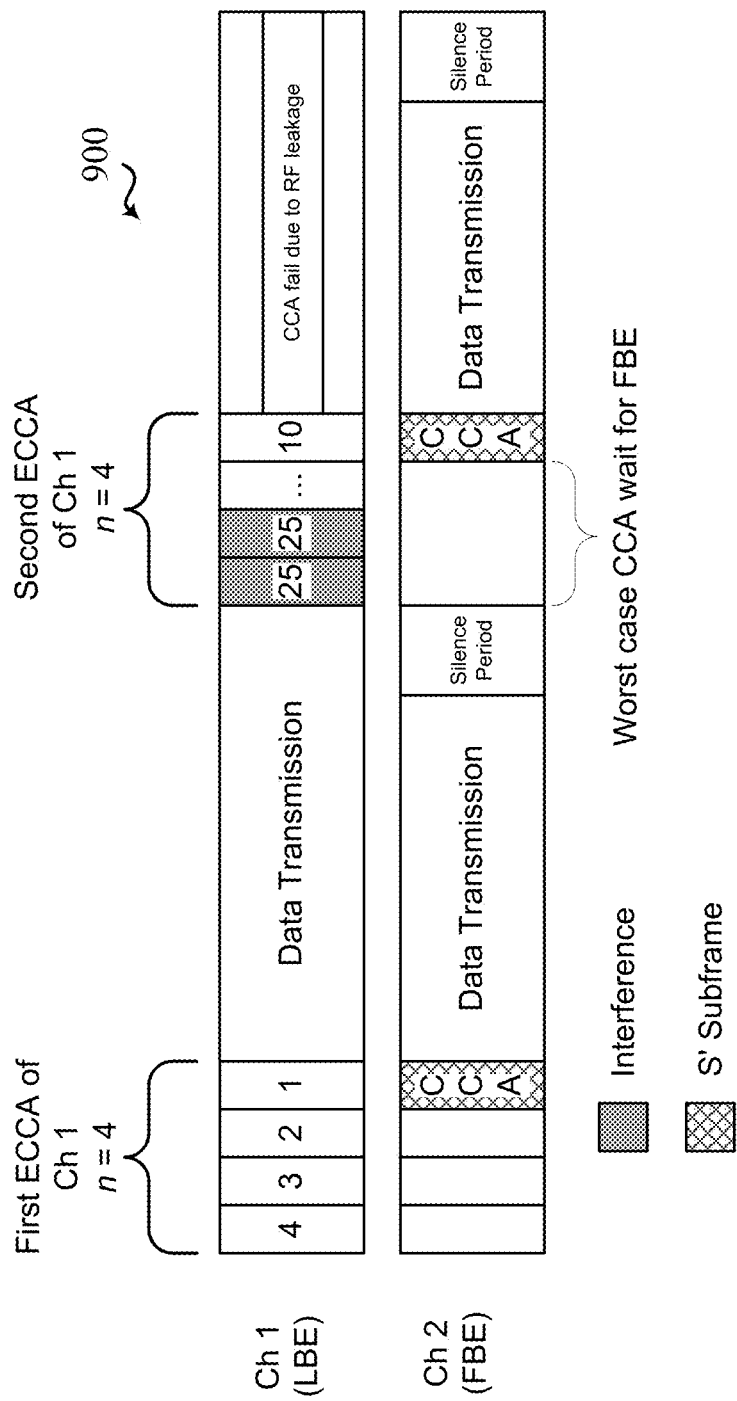
FIG. 9 is a diagram illustrating a multi-carrier transmission over adjacent channels where LBE carriers and FBE carriers are jointly used.

FIG. 9 is a diagram 900 illustrating a multi-carrier transmission over adjacent channels where LBE carriers and FBE carriers are jointly used. Referring to FIG. 9, all carriers may be classified into two groups. For example, Group 1 may include LBE channels (e.g., channel 1) and Group 2 may include FBE channels (e.g., channel 2).

In an aspect, a transmitter performs CCA for an FBE channel at a last ECCA timeslot of an LBE channel. However, a location of the CCA for the FBE channel may be constrained (e.g., to the S' subframe) due to restrictions on an FBE frame structure. Accordingly, the transmitter may perform the CCA for the FBE channel at a timeslot prior to the last ECCA timeslot of the LBE channel. For example, the CCA for the FBE channel may be performed at a threshold timeslot, wherein the threshold timeslot is a timeslot occurring after a worst-case CCA wait for the FBE channel but before the last ECCA timeslot of the LBE channel. The transmitter may then transmit data on the FBE channel if the CCA is clear. Alternatively, the transmitter may choose to remain idle on the FBE channel when the last ECCA timeslot of the LBE channel occurs past the threshold timeslot of the FBE channel.

LBE channels can ensure that there is no starvation. Due to constraints on the CCA location of the FBE channel, once the FBE channel starts transmitting data, the transmitter may jam the LBE channel due to RF leakage from the FBE channel, causing the ECCA countdown on the LBE channel to fail.

In an aspect, the transmitter may be a UE performing multi-carrier uplink transmissions using adjacent channels. The CCA procedure for the UE may be the same as for an eNB performing multi-carrier downlink transmissions using adjacent channels. In a further aspect, the UE's multi-carrier uplink transmission may be scheduled by the eNB. The eNB may indicate if any of the carriers (or grants) has priority to bias the CCA procedure at the UE. The eNB may also reserve physical uplink control channel resources on both carriers and instruct the UE to use one of the carriers depending on availability.

Figure 10A:
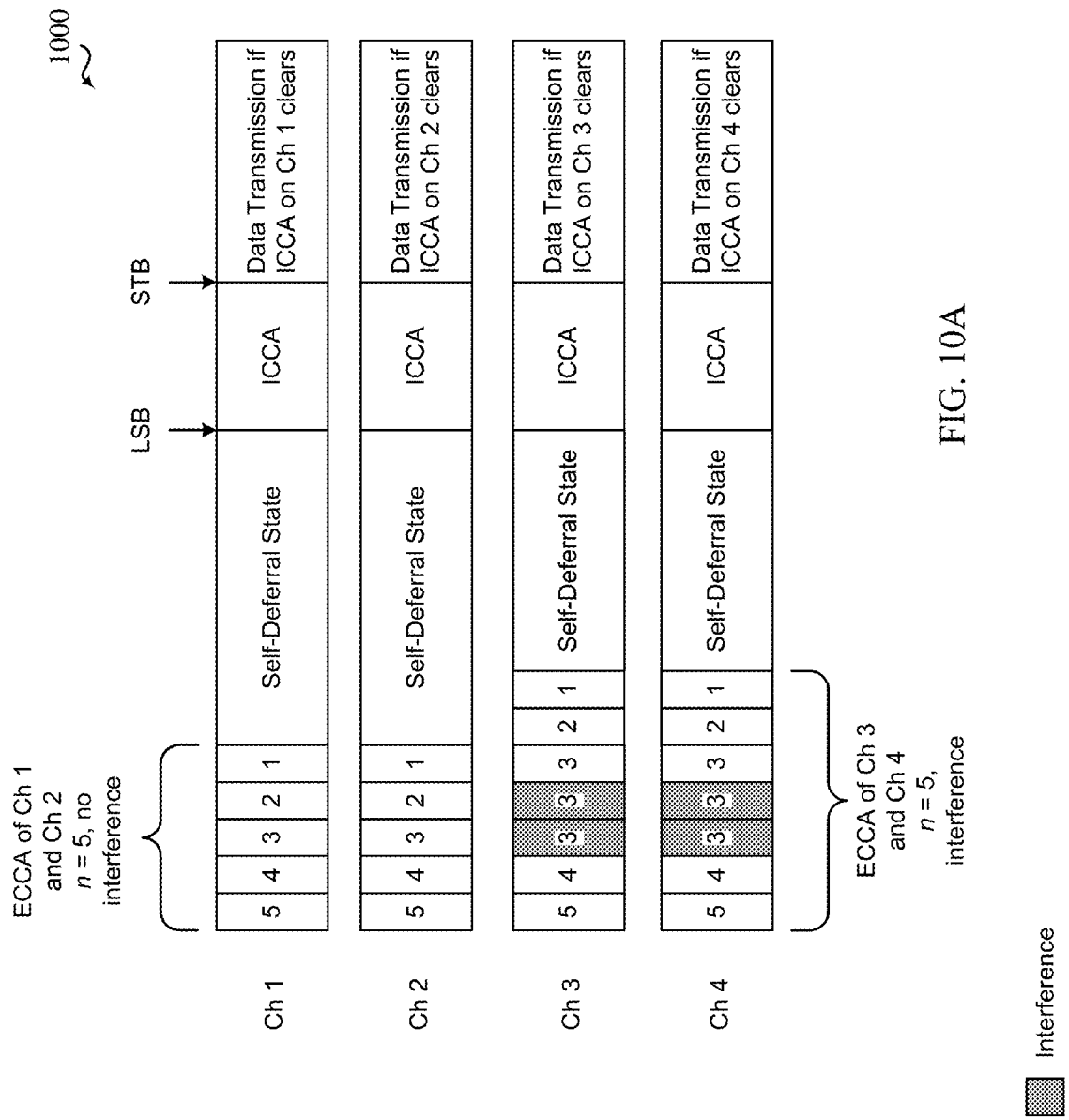
FIGS. 10A-10B are a diagram illustrating a multi-carrier transmission over adjacent channels using a self-deferral state after ECCA countdown completion.

FIG. 10A is a diagram 1000 illustrating a listen before talk (LBT) procedure in which an ECCA countdown of n=5 is performed by a transmitter on four unlicensed carriers (e.g., channel 1, channel 2, channel 3, and channel 4), two of which experience interference (e.g., channel 3 and channel 4) during the ECCA countdown. For example, the interference can be caused by WiFi beacons and management frames on the primary 20 MHz channel, bandwidth switching between 20 MHz, 40 MHz, and 80 MHz for control and data packets, and/or interferers using a subset of carriers in close vicinity to the transmitter.

Referring to FIG. 10A, once the transmitter has completed the ECCA countdown on a channel, the transmitter may enter a self-deferral state on that channel. For example, the self-deferral state can be an idle period during which the transmitter waits for the LBT synchronization boundary (LSB). This may allow time for the ECCA countdown of each the four unlicensed carriers to be completed prior to determining an initial CCA (ICCA) for each channel. For example, referring to FIG. 10A, channel 3 and channel 4 both experience interference in timeslots 3 and 4 during the ECCA countdown, and thus the ECCA of channel 3 and channel 4 ends in a later timeslot that the ECCA of channel 1 and channel 2. The self-deferral period of channel 3 and channel 4 is shorter than the self-deferral periods of channel 1 and channel 2 due to the extra timeslots needed to complete the ECCA on channel 3 and channel 4.

When the LSB is reached at the end of the self-deferral period of each of the four channels, the transmitter can perform an initial CCA (ICCA) on each of the four channels. If the CCA for a channel clears, then the transmitter is free to transmit data on that channel at the start of the synchronous transmission boundary (STB). Alternatively, the transmitter may transmit data on each of the channels when the ICCA for all of the channels is clear.

Figure 10B:
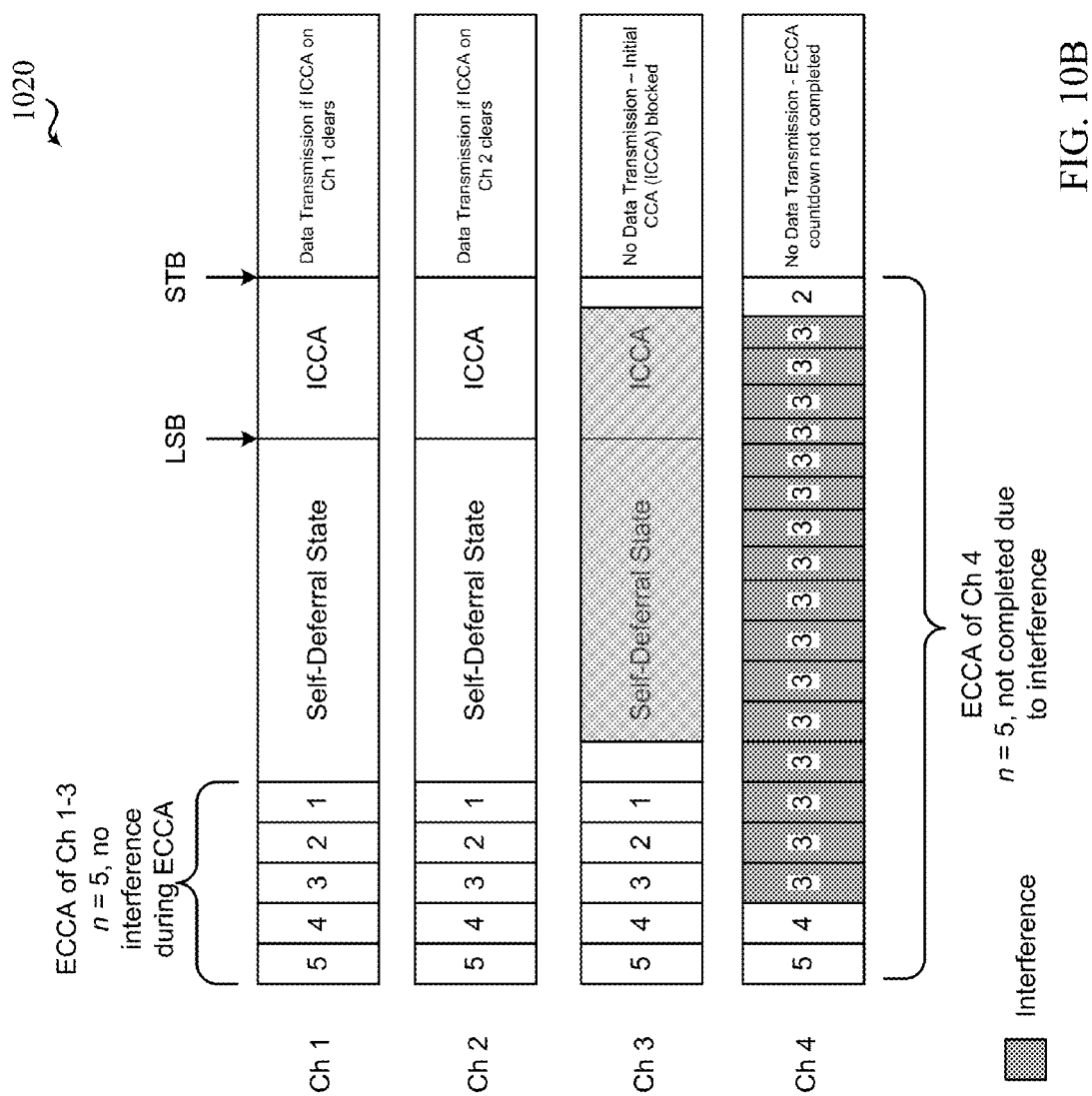

FIG. 10B is a diagram 1020 illustrating a listen before talk (LBT) procedure in which an ECCA countdown of n=5 is performed by a transmitter on four unlicensed carriers (e.g., channel 1, channel 2, channel 3, and channel 4). As seen in FIG. 10B, after completing the ECCA countdown, channel 3 experiences interference during the self-deferral state and during the ICCA. Channel 4 experiences interference during the ECCA countdown that does not allow the ECCA countdown on channel 4 to be completed before reaching the LBS. For example, the interference can be caused by WiFi beacons and management frames on the primary 20 MHz channel, bandwidth switching between 20 MHz, 40 MHz, and 80 MHz for control and data packets, and/or interferers using a subset of carriers in close vicinity to the transmitter.

Referring to FIG. 10B, channel 1 and channel 2 do not experience interference and both channels enter the self-deferral state after completion of the ECCA countdown. For example, the self-deferral state can be an idle period during which the transmitter waits for the LBT synchronization boundary (LSB). Once the LSB boundary is reached, the transmitter performs the ICCA on channel 1 and channel 2 and then transmits data at the start of the STB on channel 1 and/or channel 2 if the ICCA for that channel clears. Channel 3 also completes the ECCA countdown but then experiences interference during the self-deferral state and past the LSB, which blocks the transmitter from performing the ICCA of channel 3. Hence, the transmitter is unable to transmit data on channel 3 due to the ICCA being blocked.

Referring still to FIG. 10B, channel 4 experiences interference during the ECCA countdown that does not allow the transmitter to complete the ECCA countdown of channel 4 before the LSB. Thus, the transmitter is unable to perform the ICCA of channel 4, and data is not transmitted on channel 4 since the ECCA countdown was not completed.

Figure 11:
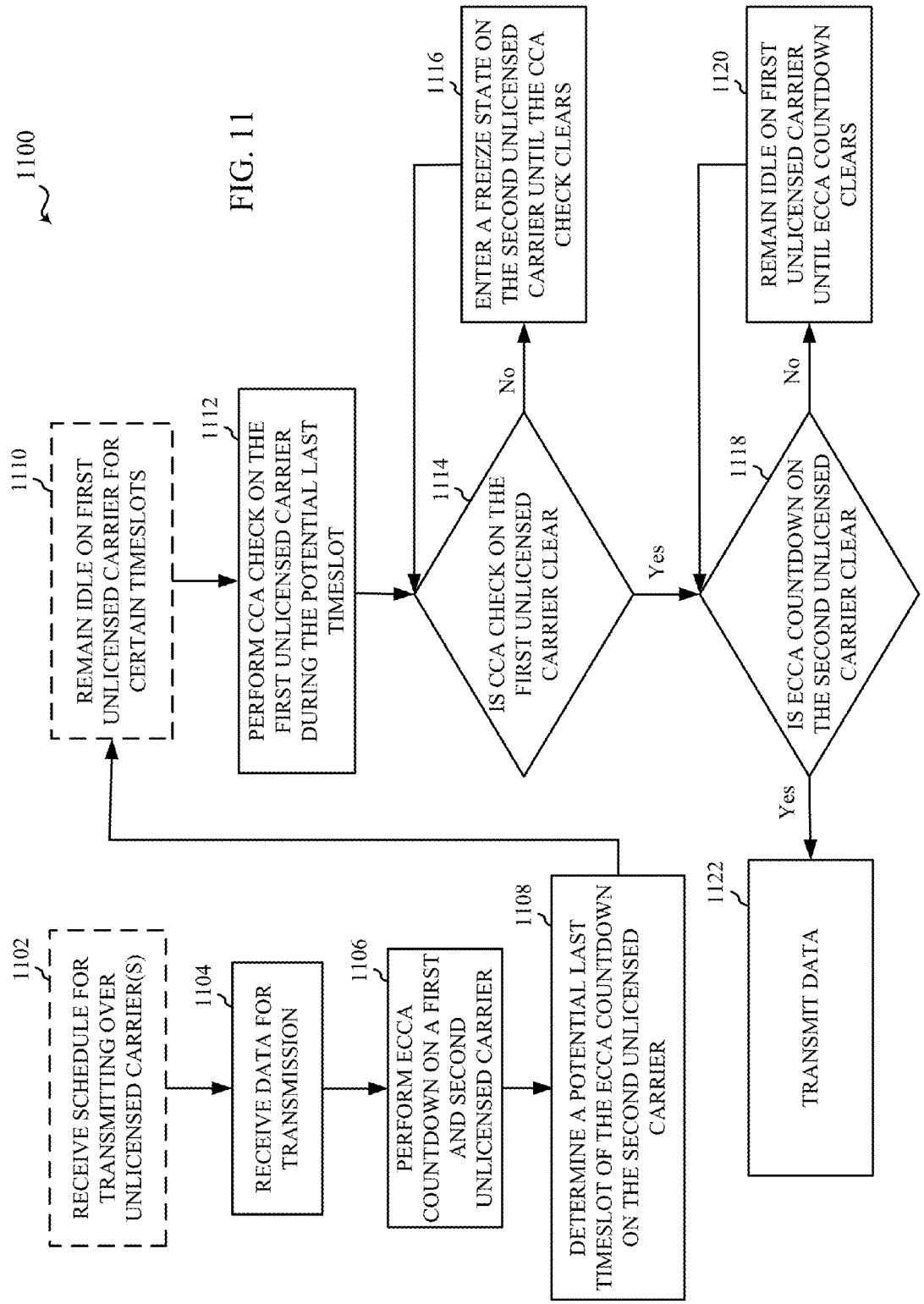
FIG. 11 is a flow chart of a method of wireless communication.

FIG. 11 is a flowchart 1100 of a method of wireless communication. The method may be performed by a device (e.g., UE 115, 115-a, 115-b or base station 105, 105-a, 105-b). It should be understood that the operations indicated with dashed lines represent optional operations for various aspects of the disclosure.

In an aspect, if the device is embodied as a UE (e.g., UE 115), at step 1102, the device may receive from a schedule for transmitting over one or more of the at least two unlicensed carriers. The schedule can be received on a licensed carrier or an unlicensed carrier. In addition, the schedule can be received from a base station or from another network entity. For example, referring to FIG. 2B, the base station 105-b may transmit OFDMA communications signals to the UE 115-b using a bidirectional link 240. The bidirectional link 240 may include the at least two unlicensed carriers and be associated with a frequency F3 in the unlicensed spectrum described above with reference to FIG. 2A. The OFDMA communications signals transmitted from the base station 105-b to the UE 115-b may include the schedule that the UE 115-b can use to transmit over the one or more of the at least two unlicensed carriers. The schedule may indicate a maximum number of timeslots for remaining idle on a first unlicensed carrier, a validity of a resource grant on at least one of the first unlicensed carrier or the second unlicensed carrier, and/or a priority among unlicensed carriers for transmission to the base station. The schedule may also include information related to transmitting a physical uplink control channel (PUCCH). In an aspect, the schedule can indicate to the UE 115-b which carrier of the unlicensed spectrum is the primary carrier and which is the secondary carrier. For example, the schedule can indicate parameters that the UE 115-b can use for the CCA procedure. The schedule may also indicate the carrier (e.g., the primary carrier and/or secondary carrier) that receives the ECCA countdown and which carrier (e.g., the primary carrier and/or second carrier) receives the CCA check. In an aspect, the schedule can indicate to the UE 115-b resources on the primary carrier and/or second carrier to transmit the PUCCH. For example, if the schedule specifies resources reserved on both the primary carrier and the secondary carrier for transmitting the PUCCH, the UE 115-b can transmit the PUCCH using the reserved resources of the first carrier to pass a CCA check. In an aspect, the schedule can include which of the primary carrier and/or secondary carrier is assigned priority with respect to transmitting the data. For example, priority can be assigned based on CCA checkout, signal-to-noise ratio, and/or the frequency of the carrier.

At step 1104, the device receives data for transmission over at least two unlicensed carriers, the at least two unlicensed carriers including a first unlicensed carrier and a second unlicensed carrier. For example, referring to FIG. 4, if the device is a base station 105, then the data for transmission may be received at a transmit processor 420 from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), EPDCCH, etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. However, referring again to FIG. 4, if the device is a UE 115, then on the uplink a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.).

At step 1106, the device performs an extended clear channel assessment (ECCA) countdown on each of the at least two unlicensed carriers. For example, referring to FIG. 7, an ECCA countdown can be performed on channel 1 and channel 2, which can both be unlicensed carriers.

At step 1108, the device determines a potential last timeslot from one or more potential last timeslots of the ECCA countdown on a second unlicensed carrier. For example, referring to FIG. 7, channel 2 may experience interference that causes the ECCA countdown of channel 2 to end later than the ECCA of channel 1 which does not experience the interference.

Accordingly, at step 1110, the device remains idle on the first unlicensed carrier during at least one timeslot past an potential last timeslot of the ECCA countdown on the first unlicensed carrier until the potential last timeslot of the ECCA countdown on the second unlicensed carrier is reached. For example, referring to FIG. 7, channel 1 may be idle for extra CCA timeslots to let channel 2 "catch up" due to the interference experienced by channel 2. This may be equivalent to idle time control.

At step 1112, the device performs a CCA check on the first unlicensed carrier during the potential last timeslot. For example, referring to FIG. 7, a CCA is performed in the third timeslot past the end of the ECCA countdown on the first unlicensed carrier, which corresponds to the potential last timeslot of the ECCA countdown of the second unlicensed carrier.

In an aspect, the device may perform the CCA check by determining a potential number of timeslots between an end of the ECCA countdown of the first unlicensed carrier and the potential last timeslot in which the ECCA countdown of the second unlicensed carrier ends. Thereafter, the device performs the CCA check on the first unlicensed carrier when the number of timeslots is greater than a threshold. For example, referring again to FIG. 7, 3 timeslots is greater than the threshold and the CCA check is performed on channel 1.

In a further aspect, the device may perform the CCA check by determining a first potential countdown value for performing the ECCA countdown of the first unlicensed carrier, determining a second potential countdown value between an end of the ECCA countdown of the first unlicensed carrier and an end of the ECCA countdown of the second unlicensed carrier, performing the CCA check on the first unlicensed carrier when a duty cycle is greater than a threshold, wherein the duty cycle is equal to the second potential countdown value divided by a sum of the first potential countdown value and the second potential countdown value. For example, referring to FIG. 7, there are 5 timeslots for performing the ECCA countdown of channel 1 and there are 3 timeslots between the end of the ECCA countdown of channel 1 and the timeslot in which the ECCA countdown of channel 2 ends. Thereafter, the device performs the CCA check on the first unlicensed carrier when a duty cycle is greater than a threshold. In one aspect, the duty cycle can be equal to the second number of timeslots divided by a sum of the first number of timeslots and the second number of timeslots. For example, referring again to FIG. 7, the duty cycle (e.g., 3/(5+3)) is greater than the threshold and the CCA is performed on channel 1.

At step 1114, the device determines if the CCA check of the first unlicensed carrier is clear. For example, referring to FIG. 7, a transmitter can determine if the CCA check is clear by if the energy level detected by the transmitter during the CCA is less than a threshold indicating that the channel is clear.

At step 1116, the device can enter a freeze state on the second unlicensed carrier until the CCA check clears. For example, referring to FIG. 7, if the CCA on the first unlicensed carrier does not clear during the potential last timeslot, the second unlicensed carrier can enter a freeze state for additional timeslots past the end of the ECCA countdown until the first unlicensed carrier clears the CCA check.

At step 1118, the device determines if the ECCA check of the second unlicensed carrier is clear. For example, referring to FIG. 7, a transmitter can determine if the ECCA check is clear by if the energy level detected by the transmitter during each of the timeslots in the ECCA is less than a threshold indicating that the channel is clear.

At step 1120, the device can remain idle on the first unlicensed carrier until the ECCA countdown clears. For example, referring to FIG. 7, the first unlicensed carrier can remain idle in at least one additional timeslot past the potential last timeslot until the ECCA countdown on the second unlicensed carrier clears.

At step 1122, the device transmits the data on the first unlicensed carrier if the CCA check is clear. The device may also transmit the data on the second unlicensed carrier when the ECCA countdown of the second unlicensed carrier ends. For example, referring to FIG. 7, the data can be transmitted after the $8^{th}$ timeslot (e.g., timeslot 1) of channel 1 if the CCA check is clear. Referring again to FIG. 7, the data may also be transmitted after the $8^{th}$ timeslot (e.g., timeslot 1) when the ECCA countdown of channel 2 ends. If the device is a base station 105, then, referring to FIG. 4, downlink data signals from modulators 432a through 432t may be transmitted via the antennas 434a through 434t, respectively. However, referring again to FIG. 4, if the device is a UE 115, then uplink data symbols may be transmitted via the antennas 452a through 454r.

Figure 12:
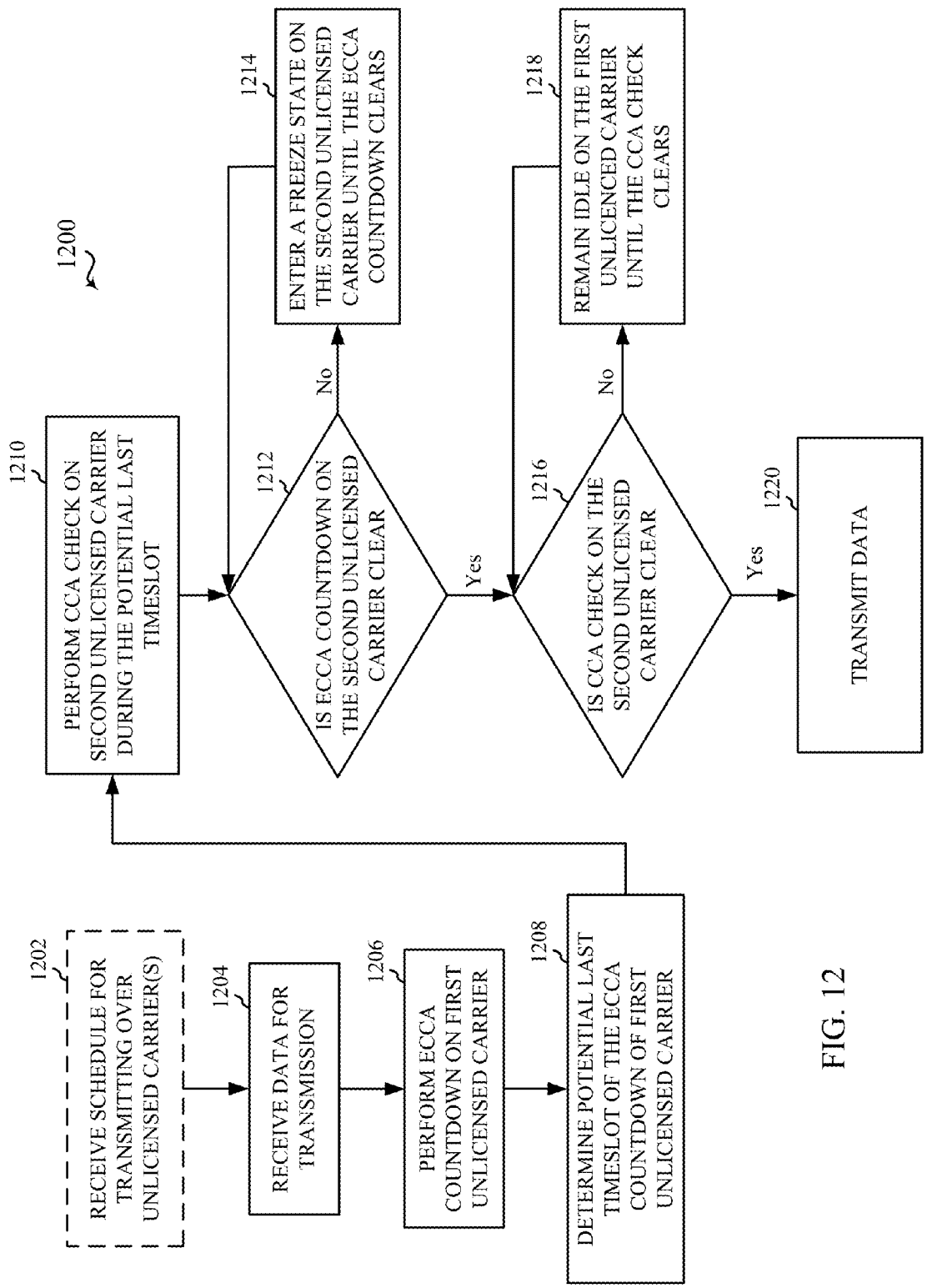
FIG. 12 is a flow chart of a method of wireless communication.

FIG. 12 is a flow chart 1200 of a method of wireless communication. The method may be performed by a device (e.g., UE 115 or base station 105). It should be understood that the operations indicated with dashed lines represent optional operations for various aspects of the disclosure.

In an aspect, if the device is embodied as a UE (e.g., UE 115), at step 1202, the device may receive from a base station a schedule for transmitting over one or more of the at least two unlicensed carriers. The schedule can be received on a licensed carrier or an unlicensed carrier. In addition, the schedule can be received from a base station or from another network entity. For example, referring to FIG. 2B, the base station 105-b may transmit OFDMA communications signals to the UE 115-b using a bidirectional link 240. The bidirectional link 240 may include the at least two unlicensed carriers and be associated with a frequency F3 in the unlicensed spectrum described above with reference to FIG. 2A. The OFDMA communications signals transmitted from the base station 105-b to the UE 115-b may include the schedule that the UE 115-b can use to transmit over the one or more of the at least two unlicensed carriers. The schedule may indicate a maximum number of timeslots for remaining idle on a first unlicensed carrier, a validity of a resource grant on at least one of the first unlicensed carrier or the second unlicensed carrier, and/or a priority among unlicensed carriers for transmission to the base station. The schedule may also include information related to transmitting a physical uplink control channel (PUCCH). In an aspect, the schedule can indicate to the UE 115-b which carrier of the unlicensed spectrum is the primary carrier and which is the secondary carrier. For example, the schedule can indicate parameters that the UE 115-b can use for the CCA procedure. The schedule may also indicate the carrier (e.g., the primary carrier and/or secondary carrier) on which to perform the ECCA countdown and on which carrier (e.g., the primary carrier and/or second carrier) to perform the CCA check. In an aspect, the schedule can indicate to the UE 115-b resources on the primary carrier and/or second carrier to transmit the PUCCH. For example, if the schedule specifies resources reserved on both the primary carrier and the secondary carrier for transmitting the PUCCH, the UE 115-b can transmit the PUCCH using the reserved resources of the first carrier to pass a CCA check. In an aspect, the schedule can include which of the primary carrier and/or secondary carrier is assigned priority with respect to transmitting the data. For example, priority can be assigned based on CCA checkout, signal-to-noise ratio, and/or the frequency of the carrier. With respect to the a validity of a resource grant on at least one of the first unlicensed carrier or the second unlicensed carrier, the UE 115-b may receive a cross-carrier grant for unlicensed carriers. In some scenarios such as when using partial subframes or due to processing limitations, the grant has to be transmitted before the unlicensed transmission can start. So, some additional signaling can be used to determine the validity of a resource grant.

At step 1204, the device receives data for transmission over at least two unlicensed carriers. For example, referring to FIG. 4, if the device is a base station 105, then the data for transmission may be received at a transmit processor 420 from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. However, referring again to FIG. 4, if the device is a UE 115, then on the uplink a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.).

At step 1206, the device performs an extended clear channel assessment (ECCA) countdown on a first unlicensed carrier. For example, referring to FIG. 8, an ECCA countdown can be performed on channel 1, which can be an unlicensed carrier.

At step 1208, the device determines a potential last time timeslot from one or more potential last timeslots for the ECCA countdown of the first unlicensed carrier. For example, referring to FIG. 8, due to interference in the $3^{rd}$, $4^{th}$, and $5^{th}$ timeslots, the ECCA countdown of channel 1 ends in the $7^{th}$ timeslot (e.g., timeslot 1).

At step 1210, the device performs a clear channel assessment (CCA) check on a second unlicensed carrier. For example, referring to FIG. 8, a CCA is performed in the $7^{th}$ timeslot in channel 2, which corresponds to the timeslot in which the ECCA countdown of channel 1 ends.

At step 1212, the device determines if the ECCA check of the first unlicensed carrier is clear. For example, referring to FIG. 8, a transmitter can determine if the ECCA check is clear by if the energy level detected by the transmitter during each of the timeslots in the ECCA is less than a threshold indicating that the channel is clear.

At step 1214, the device can enter a freeze state on the second unlicensed carrier until the ECCA check clears. For example, referring to FIG. 8, if the ECCA on the first unlicensed carrier does not clear during the potential last timeslot, the second unlicensed carrier can enter a freeze state for additional timeslots past the CCA check.

At step 1216, the device determines if the CCA check of the second unlicensed carrier is clear. For example, referring to FIG. 8, a transmitter can determine if the CCA check is clear by if the energy level detected by the transmitter during the CCA is less than a threshold indicating that the channel is clear.

At step 1218, the device can remain idle on the first unlicensed carrier until the CCA check clears. For example, referring to FIG. 8, the first unlicensed carrier can remain idle in at least one additional timeslot past the potential last timeslot until the CCA clears on the second unlicensed carrier clears.

At step 1220, the device transmits the data on the second unlicensed carrier if the CCA check is clear. The device may also transmit the data on the first unlicensed carrier when the ECCA countdown of the first unlicensed carrier ends. For example, referring to FIG. 8, data can be transmitted after the $7^{th}$ timeslot in channel 2, if the CCA performed in the $7^{th}$ timeslot clears. Referring again to FIG. 8, data may also be transmitted after the $7^{th}$ timeslot (e.g., timeslot 1) in channel 1 when the ECCA countdown ends. If the device is a base station 105, then, referring to FIG. 4, downlink data signals from modulators 432a through 432t may be transmitted via the antennas 434a through 434t, respectively. However, referring again to FIG. 4, if the device is a UE 115, then uplink data symbols may be transmitted via the antennas 452a through 454r.

Figure 13:
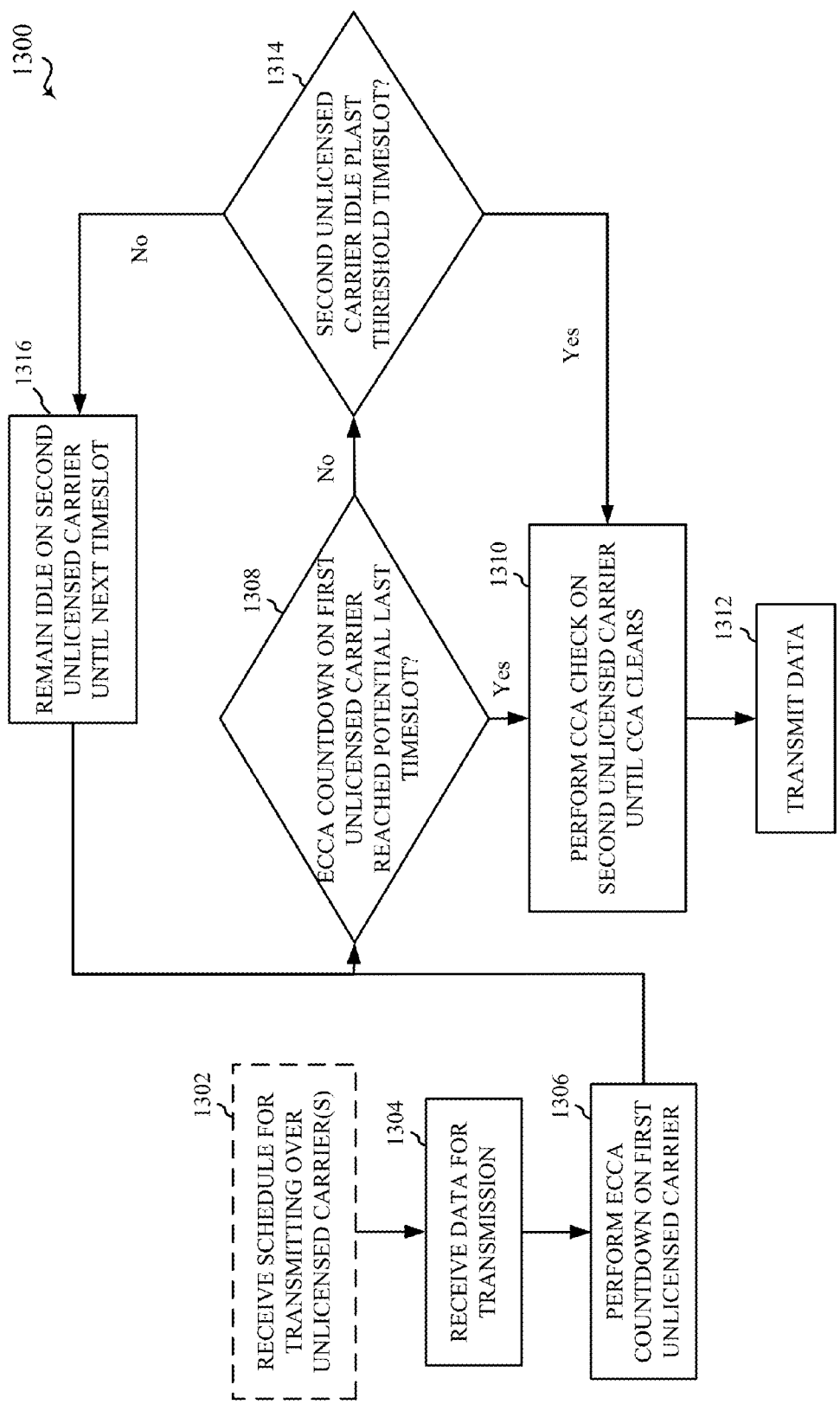
FIG. 13 is a flow chart of a method of wireless communication.

FIG. 13 is a flow chart 1300 of a method of wireless communication. The method may be performed by a device (e.g., UE 115 or base station 105). It should be understood that the operations indicated with dashed lines represent operations for various aspects of the disclosure.

In an aspect, if the device is embodied as a UE (e.g., UE 115), at step 1302, the device may receive from a base station a schedule for transmitting over one or more of the at least two unlicensed carriers. The schedule can be received on a licensed carrier or an unlicensed carrier. In addition, the schedule can be received from a base station or from another network entity. For example, referring to FIG. 2B, the base station 105-b may transmit OFDMA communications signals to the UE 115-b using a bidirectional link 240. The bidirectional link 240 may include the at least two unlicensed carriers and be associated with a frequency F3 in the unlicensed spectrum described above with reference to FIG. 2A. The OFDMA communications signals transmitted from the base station 105-b to the UE 115-b may include the schedule that the UE 115-b can use to transmit over the one or more of the at least two unlicensed carriers. The schedule may indicate a maximum number of timeslots for remaining idle on a first unlicensed carrier, a validity of a resource grant on at least one of the first unlicensed carrier or the second unlicensed carrier, and/or a priority among unlicensed carriers for transmission to the base station. The schedule may also include information related to transmitting a physical uplink control channel (PUCCH). In an aspect, the schedule can indicate to the UE 115-b which carrier of the unlicensed spectrum is the primary carrier and which is the secondary carrier. For example, the schedule can indicate parameters that the UE 115-b can use for the CCA procedure. The schedule may also indicate the carrier (e.g., the primary carrier and/or secondary carrier) that receives the ECCA countdown and which carrier (e.g., the primary carrier and/or second carrier) receives the CCA check. In an aspect, the schedule can indicate to the UE 115-b resources on the primary carrier and/or second carrier to transmit the PUCCH. For example, if the schedule specifies resources reserved on both the primary carrier and the secondary carrier for transmitting the PUCCH, the UE 115-b can transmit the PUCCH using the reserved resources of the first carrier to pass a CCA check. In an aspect, the schedule can include which of the primary carrier and/or secondary carrier is assigned priority with respect to transmitting the data. For example, priority can be assigned based on CCA checkout, signal-to-noise ratio, and/or the frequency of the carrier.

At step 1304, the device receives data for transmission over at least two unlicensed carriers. For example, referring to FIG. 4, if the device is a base station 105, then the data for transmission may be received at a transmit processor 420 from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. However, referring again to FIG. 4, if the device is a UE 115, then on the uplink a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.).

At step 1306, the device performs an extended clear channel assessment (ECCA) countdown on a first of the at least two unlicensed carriers. In an aspect, referring to FIG. 9, the at least two unlicensed carriers may be classified into two groups. For example, Group 1 may include LBE channels (e.g., channel 1) and Group 2 may include FBE channels (e.g., channel 2). For example, referring to FIG. 9, an ECCA can be performed on the LBE channel (e.g., channel 1) that is experiencing interference. In an aspect, a transmitter performs CCA for an FBE channel at a last ECCA timeslot of an LBE channel. However, a location of the CCA for the FBE channel (e.g., channel 2) may be constrained (e.g., to the S' subframe) due to restrictions on an FBE frame structure. Accordingly, the transmitter may perform the CCA for the FBE channel (e.g., channel 2) at a timeslot prior to the last ECCA timeslot of the LBE channel (e.g., channel 1).

At step 1308, the device determines whether a timeslot in which the ECCA countdown of the first unlicensed carrier ends occurs past a threshold timeslot of a second of the at least two unlicensed carriers. For example, with reference to FIG. 9, the device can determine if the ECCA countdown of the LBE channel (e.g., channel 1) has exceeded a threshold timeslot (e.g., S' subframe) of the FBE channel (e.g., channel 2).

Based on the determination at step 1308, the device determines if the ECCA countdown on the first unlicensed carrier has reached a potential last timeslot. For example, referring to FIG. 9, the transmitter determines if the ECCA countdown has reached the timeslot labeled "1".

At step 1310, based on a positive result at step 1308 (i.e., the ECCA countdown has reached the potential last timeslot), the device performs a CCA check on the second unlicensed carrier until the CCA clears. For example, with reference to FIG. 9, the threshold timeslot can be the $4^{th}$ timeslot (e.g., the S' subframe). Thus, a first ECCA countdown of the LBE channel (e.g., channel 1) occurs in timeslots 4-1, and since the first ECCA of the LBE channel does not end past the $4^{th}$ timeslot (e.g., S' subframe), the CCA check of the FBE channel (e.g., channel 2) can be performed in timeslot 1.

The device then proceeds to step 1312, where the device transmits the data on the second unlicensed carrier if the CCA check is clear. For example, referring to FIG. 9, data can be transmitted after the $4^{th}$ timeslot in the FBE channel (e.g., channel 2), if the CCA performed in the $4^{th}$ timeslot clears. In an aspect, if the device is a base station 105, then, referring to FIG. 4, downlink data signals from modulators 432a through 432t may be transmitted via the antennas 434a through 434t, respectively. However, referring again to FIG. 4, if the device is a UE 115, then uplink data symbols may be transmitted via the antennas 452a through 454r.

At step 1314, based on a negative result at step 1308 (i.e., the ECCA countdown has not reached the potential last timeslot), the device determines if the second unlicensed carrier is past an idle threshold timeslot. For example, with reference to FIG. 9, idle threshold timeslot of the second unlicensed carrier can occur in the $4^{th}$ timeslot, and the transmitter can determine if the ECCA countdown occurs past the $4^{th}$ timeslot.

Based on a negative result at step 1314, at step 1316 the device can remain idle on the second unlicensed carrier until next timeslot. For example, referring to FIG. 9, the second unlicensed carrier can remain idle on the $1^{st}$, $2^{nd}$, and $3^{rd}$ timeslots since idle threshold timeslot has not been reached until the $4^{th}$ timeslot. The device then starts back at step 1308.

Based on a positive result at step 1314, at step 1310 the device performs a CCA check on the second unlicensed carrier until the CCA clears. For example, with reference to FIG. 9, the threshold timeslot can be the $4^{th}$ timeslot (e.g., the S' subframe). Thus, the CCA check of the FBE channel (e.g., channel 2) can be performed in timeslot 1, and can continue to be performed until the CCA clears a timeslot on the second unlicensed carrier.

The device then proceeds to step 1312, where the device transmits the data on the second unlicensed carrier if the CCA check is clear. For example, referring to FIG. 9, data can be transmitted after the $4^{th}$ timeslot in the FBE channel (e.g., channel 2), if the CCA performed in the $4^{th}$ timeslot clears. In an aspect, if the device is a base station 105, then, referring to FIG. 4, downlink data signals from modulators 432a through 432t may be transmitted via the antennas 434a through 434t, respectively. However, referring again to FIG. 4, if the device is a UE 115, then uplink data symbols may be transmitted via the antennas 452a through 454r.

Figure 14:
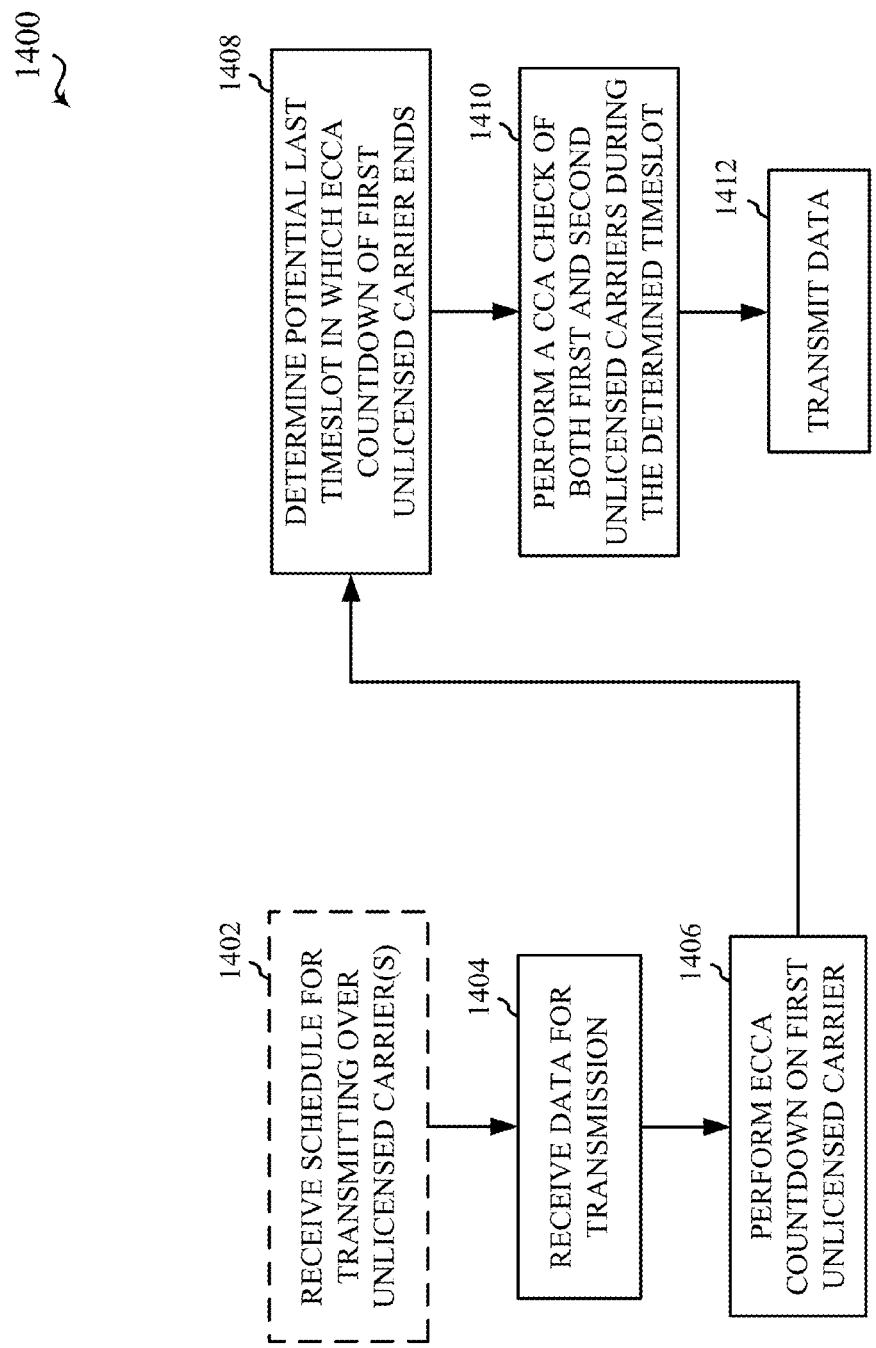
FIG. 14 is a flow chart of a method of wireless communication.

FIG. 14 is a flow chart 1400 of a method of wireless communication. The method may be performed by a device (e.g., UE 115 or base station 105). It should be understood that the operations indicated with dashed lines represent operations for various aspects of the disclosure.

In an aspect, if the device is embodied as a UE (e.g., UE 115), at step 1402, the device may receive from a base station a schedule for transmitting over one or more of the at least two unlicensed carriers. The schedule can be received on a licensed carrier or an unlicensed carrier. In addition, the schedule can be received from a base station or from another network entity. For example, referring to FIG. 2B, the base station 105-b may transmit OFDMA communications signals to the UE 115-b using a bidirectional link 240. The bidirectional link 240 may include the at least two unlicensed carriers and be associated with a frequency F3 in the unlicensed spectrum described above with reference to FIG. 2A. The OFDMA communications signals transmitted from the base station 105-b to the UE 115-b may include the schedule that the UE 115-b can use to transmit over the one or more of the at least two unlicensed carriers. The schedule may indicate a maximum number of timeslots for remaining idle on a first unlicensed carrier, a validity of a resource grant on at least one of the first unlicensed carrier or the second unlicensed carrier, and/or a priority among unlicensed carriers for transmission to the base station. The schedule may also include information related to transmitting a physical uplink control channel (PUCCH). In an aspect, the schedule can indicate to the UE 115-b which carrier of the unlicensed spectrum is the primary carrier and which is the secondary carrier. For example, the schedule can indicate parameters that the UE 115-b can use for the CCA procedure. The schedule may also indicate the carrier (e.g., the primary carrier and/or secondary carrier) that receives the ECCA countdown and which carrier (e.g., the primary carrier and/or second carrier) receives the CCA check. In an aspect, the schedule can indicate to the UE 115-b resources on the primary carrier and/or second carrier to transmit the PUCCH. For example, if the schedule specifies resources reserved on both the primary carrier and the secondary carrier for transmitting the PUCCH, the UE 115-b can transmit the PUCCH using the reserved resources of the first carrier to pass a CCA check. In an aspect, the schedule can include which of the primary carrier and/or secondary carrier is assigned priority with respect to transmitting the data. For example, priority can be assigned based on CCA checkout, signal-to-noise ratio, and/or the frequency of the carrier.

At step 1404, the device receives data for transmission over at least two unlicensed carriers. For example, referring to FIG. 4, if the device is a base station 105, then the data for transmission may be received at a transmit processor 420 from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. However, referring again to FIG. 4, if the device is a UE 115, then on the uplink a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.).

At step 1406, the device performs an extended clear channel assessment (ECCA) countdown on a first of the at least two unlicensed carriers. For example, referring to FIG. 10, an ECCA countdown can be performed on channel 1, which can be an unlicensed carrier.

At step 1408, the device determines a timeslot in which the ECCA countdown of the first unlicensed carrier ends. For example, referring to FIG. 8, due to interference in the $3^{th}$, $4^{th}$, and $5^{th}$ timeslots, the ECCA countdown of channel 1 ends in the $8^{th}$ timeslot (e.g., timeslot 1).

At step 1410, the device performs a clear channel assessment (CCA) check of both the first and a second of the least two unlicensed carriers during the determined timeslot. For example, referring to FIG. 8, a CCA can be performed in the $8^{th}$ timeslot in both channel 1 and channel 2, which corresponds to the potential last timeslot of the ECCA countdown of channel 1.

At step 1412, the device transmits the data on any of the first and the second of the at least two unlicensed carrier when the CCA check is clear. The device may also transmit the data on the first unlicensed carrier when the ECCA countdown of the first unlicensed carrier ends. For example, referring to FIG. 8, data can be transmitted after the $8^{th}$ timeslot in either or both channel 1 and/or channel 2, if the CCA performed in the respective $8^{th}$ timeslot clears. Referring again to FIG. 8, data may also be transmitted after the $8^{th}$ timeslot (e.g., timeslot 1) in channel 1 when the ECCA countdown ends. If the device is a base station 105, then, referring to FIG. 4, downlink data signals from modulators 432a through 432t may be transmitted via the antennas 434a through 434t, respectively. However, referring again to FIG. 4, if the device is a UE 115, then uplink data symbols may be transmitted via the antennas 452a through 454r.

Figure 15:
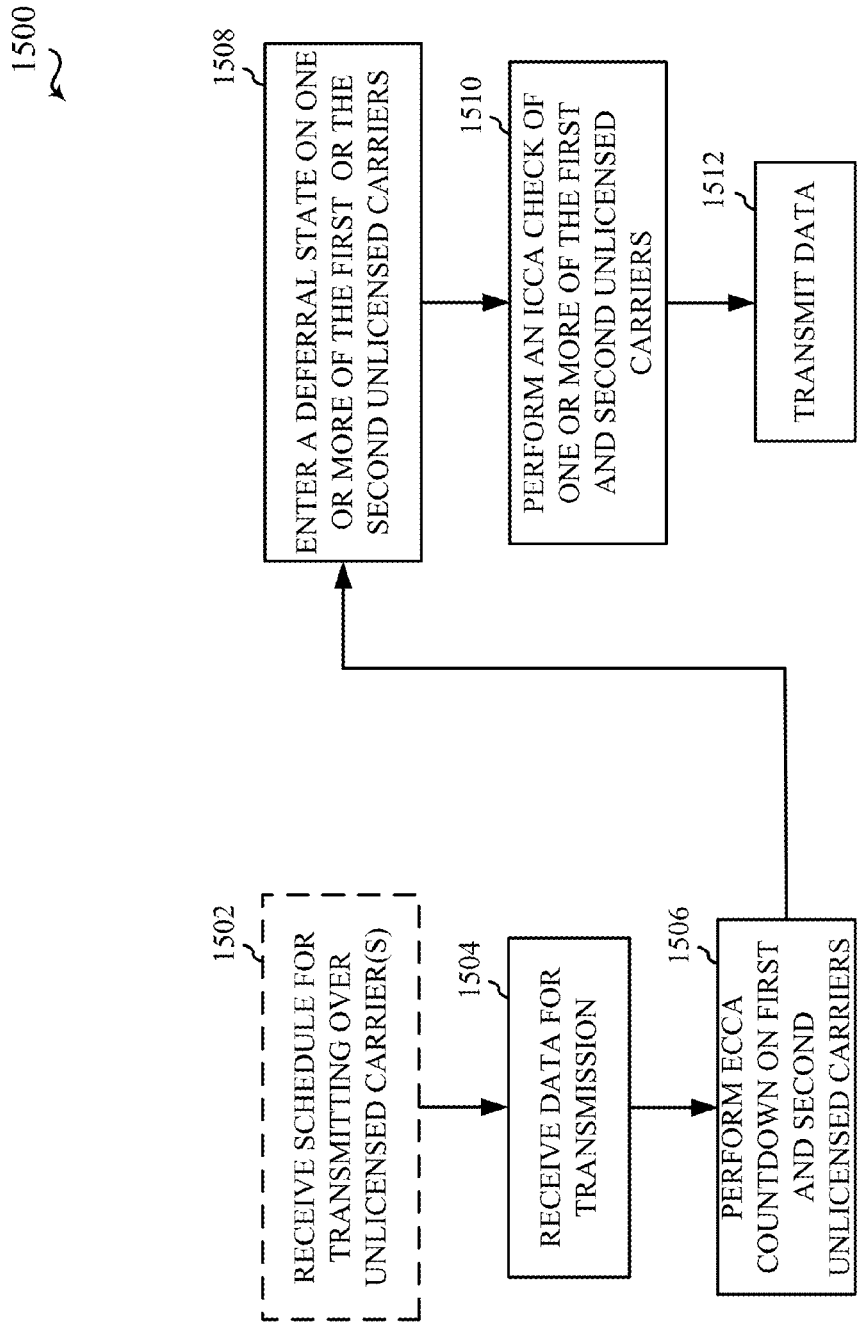
FIG. 15 is a flow chart of a method of wireless communication.

FIG. 15 is a flow chart 1500 of a method of wireless communication. The method may be performed by a device (e.g., UE 115 or base station 105). It should be understood that the operations indicated with dashed lines represent operations for various aspects of the disclosure.

In an aspect, if the device is embodied as a UE (e.g., UE 115), at step 1502, the device may receive from a base station a schedule for transmitting over one or more of the at least two unlicensed carriers. The schedule can be received on a licensed carrier or an unlicensed carrier. In addition, the schedule can be received from a base station or from another network entity. For example, referring to FIG. 2B, the base station 105-b may transmit OFDMA communications signals to the UE 115-b using a bidirectional link 240. The bidirectional link 240 may include the at least two unlicensed carriers and be associated with a frequency F3 in the unlicensed spectrum described above with reference to FIG. 2A. The OFDMA communications signals transmitted from the base station 105-b to the UE 115-b may include the schedule that the UE 115-b can use to transmit over the one or more of the at least two unlicensed carriers. The schedule may indicate a maximum number of timeslots for remaining idle on a first unlicensed carrier, a validity of a resource grant on at least one of the first unlicensed carrier or the second unlicensed carrier, and/or a priority among unlicensed carriers for transmission to the base station. The schedule may also include information related to transmitting a physical uplink control channel (PUCCH). In an aspect, the schedule can indicate to the UE 115-b which carrier of the unlicensed spectrum is the primary carrier and which is the secondary carrier. For example, the schedule can indicate parameters that the UE 115-b can use for the CCA procedure. The schedule may also indicate the carrier (e.g., the primary carrier and/or secondary carrier) that receives the ECCA countdown and which carrier (e.g., the primary carrier and/or second carrier) receives the CCA check. In an aspect, the schedule can indicate to the UE 115-b resources on the primary carrier and/or second carrier to transmit the PUCCH. For example, if the schedule specifies resources reserved on both the primary carrier and the secondary carrier for transmitting the PUCCH, the UE 115-b can transmit the PUCCH using the reserved resources of the first carrier to pass a CCA check. In an aspect, the schedule can include which of the primary carrier and/or secondary carrier is assigned priority with respect to transmitting the data. For example, priority can be assigned based on CCA checkout, signal-to-noise ratio, and/or the frequency of the carrier.

At step 1504, the device receives data for transmission over at least two unlicensed carriers. For example, referring to FIG. 4, if the device is a base station 105, then the data for transmission may be received at a transmit processor 420 from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. However, referring again to FIG. 4, if the device is a UE 115, then on the uplink a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.).

At step 1506, the device performs an extended clear channel assessment (ECCA) countdown on at least two unlicensed carriers. For example, referring to FIG. 10, an ECCA countdown can be performed on each unlicensed carrier (e.g., each of channels 1-4), which can be an unlicensed carrier.

At step 1508, the device enters a deferral state on one or more of the at least two unlicensed carriers. For example, referring to FIG. 10A, at the end of the ECCA countdown each of the four unlicensed carriers the transmitter enters a self-deferral state and waits to for the LSB. The self-deferral state can be an idle state. Referring to FIG. 10B, the first unlicensed carrier, the second unlicensed carrier, and the third unlicensed carrier enter the self-deferral state at the end of the ECCA countdown, but the fourth unlicensed carrier does not enter the self-deferral state since the ECCA countdown on the fourth unlicensed carrier is not completed.

At step 1510, the device performs an initial CCA (ICCA) check of one or more of the unlicensed carriers at the end of the self-deferral state. For example, referring to FIG. 10A, once the LSB is reached at the end of the self-deferral state, the transmitter performs an ICCA on each of the four unlicensed carriers. Referring to FIG. 10B, the first unlicensed carrier and the second unlicensed carrier perform an ICCA when the LSB is reached at the end of the self-deferral state. However, due to interference during the self-deferral state and past the LSB, the third unlicensed carrier is blocked from performing ICCA. The transmitter does not complete the ECCA countdown on fourth unlicensed carrier prior to the LSB and thus is not able to perform the ICCA in FIG. 10B.

At step, 1512, the device transmits the data on any of the at least two unlicensed carrier when the ICCA check is clear. The device may also transmit the data on the first unlicensed carrier when the ECCA countdown of the first unlicensed carrier ends. For example, referring to FIGS. 10A-10B, data can be transmitted if the ICCA performed on any of the unlicensed carriers clears. For example, in FIG. 10A, data can be transmitted after the STB in each of the four unlicensed carriers. However, referring to FIG. 10B, data can be transmitted in the first unlicensed carrier and the second unlicensed carrier since the ICCA is performed on these two unlicensed carriers. If the device is a base station 105, then, referring to FIG. 4, downlink data signals from modulators 432a through 432t may be transmitted via the antennas 434a through 434t, respectively. However, referring again to FIG. 4, if the device is a UE 115, then uplink data symbols may be transmitted via the antennas 452a through 454r.

Figure 16:
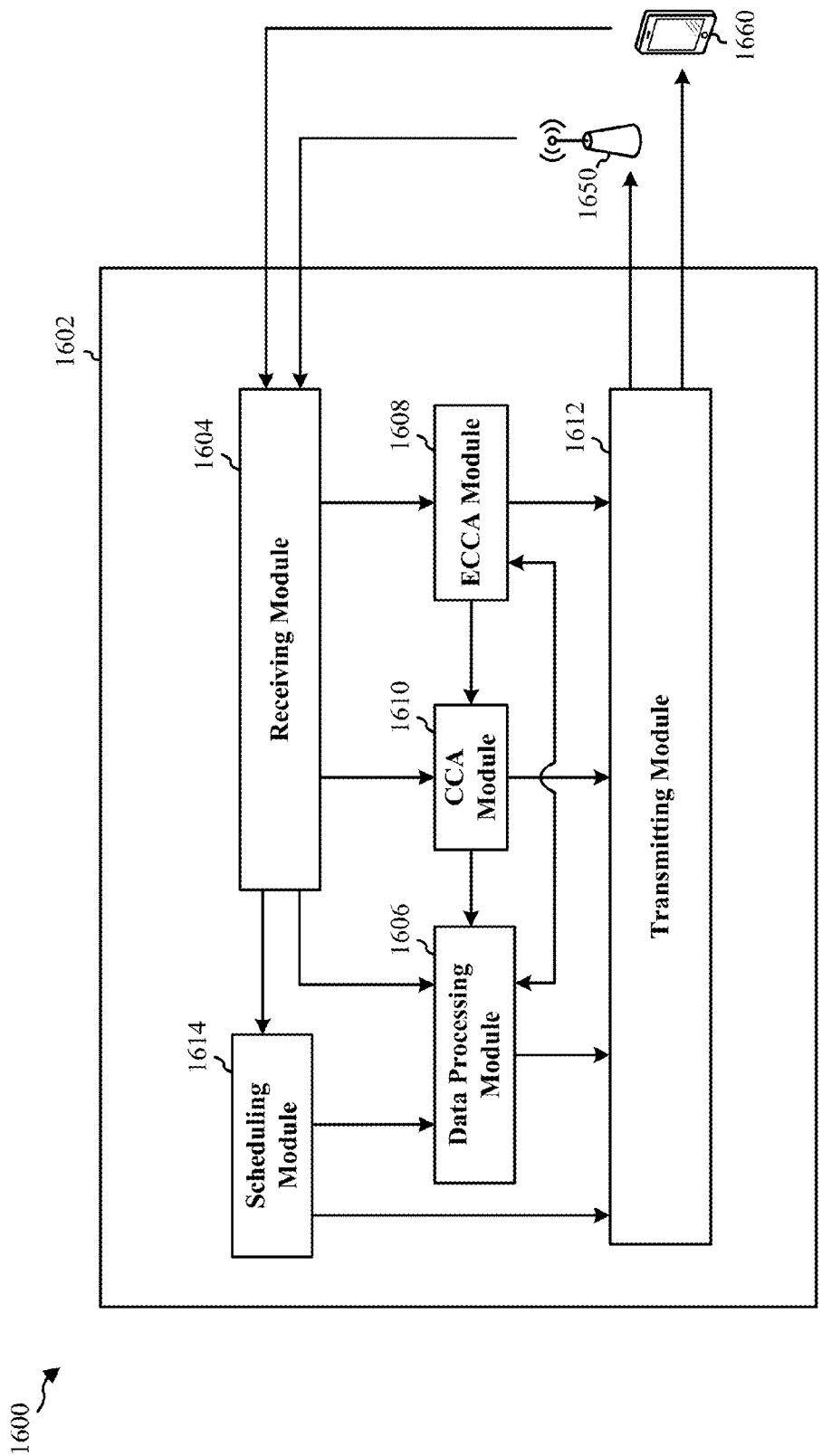
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be a UE 115 or base station 105, for example. The apparatus includes a receiving module 1604, a data processing module 1606, an ECCA module 1608, a CCA module 1610, a transmitting module 1612, and a scheduling module 1614.

The data processing module 1606 receives data for transmission over at least two unlicensed carriers. Based on the received data, the ECCA module 1608 performs an extended clear channel assessment (ECCA) countdown on one or more of the at least two unlicensed carriers.

The ECCA module 1608 determines a potential last timeslot of the ECCA countdown on the second unlicensed carrier. The CCA module 1610 remains idle on the first unlicensed carrier during at least one timeslot after the ECCA countdown of the first unlicensed carrier until the potential last timeslot of the ECCA countdown on the second unlicensed carrier is reached. In addition, the CCA module 1610 performs a clear channel assessment (CCA) check on the first unlicensed carrier during the potential last timeslot.

In another aspect, the ECCA module 1608 may determine a potential number of timeslots between the end of the ECCA countdown of the first unlicensed carrier and the end of the ECCA countdown on the second unlicensed carrier. Thereafter, the CCA module 1610 performs the CCA check on the first unlicensed carrier when the potential number of timeslots is greater than a threshold.

In a further aspect, the ECCA module 1608 may determine a first potential countdown value for performing the ECCA countdown of the first unlicensed carrier and determining a second potential countdown value between the end of the ECCA countdown of the first unlicensed carrier and the end of the ECCA countdown of the second unlicensed carrier. Thereafter, the CCA module 1610 performs the CCA check on the first unlicensed carrier when a duty cycle is greater than a threshold, wherein the duty cycle is equal to the second potential countdown value divided by a sum of the first potential countdown value and the second potential countdown value.

The CCA module 1610 can determine if the CCA check on the first unlicensed carrier is clear and the ECCA module 1608 can determine if the ECCA check of the second unlicensed carrier is clear.

The ECCA module 1608 can enter a freeze state on the second unlicensed carrier if the CCA check on the first unlicensed carrier is not clear. In addition, the CCA module 1610 can remain idle on the first unlicensed carrier until the ECCA countdown of the second unlicensed carrier clears.

The data processing module 1606 transmits (via the transmitting module 1612) the data on the first unlicensed carrier if the CCA check is clear. The data processing module 1606 may also transmit (via the transmitting module 1612) the data on the second unlicensed carrier when the ECCA countdown of the second unlicensed carrier ends.

In an aspect, the ECCA module 1608 performs an ECCA countdown on a first unlicensed carrier and determines a potential last timeslot of the ECCA countdown. The CCA module 1610 performs a CCA check on a second of the at least two unlicensed carriers during the potential last timeslot.

The ECCA module 1608 determines if the ECCA countdown on the second unlicensed carrier is clear, and the CCA module 1610 determines if the CCA check on the first unlicensed carrier is clear. In addition, the ECCA module 1608 can enter a freeze state on the second unlicensed carrier if until the CCA check clears, and the CCA module 1610 can remain idle on the first unlicensed carrier until the ECCA countdown clears.

The transmitting module 1612 transmits the data on the second unlicensed carrier if the CCA check is clear. The transmitting module 1612 may also transmit the data on the first unlicensed carrier when the ECCA countdown of the first unlicensed carrier ends.

In a further aspect, the ECCA module 1608 determines whether a potential last timeslot in which the ECCA countdown of the first unlicensed carrier ends occurs past a threshold timeslot of the second unlicensed carrier. Based on the determination, the CCA module 1610 decides whether to perform a CCA check on the second unlicensed carrier.

Based on a negative result (i.e., the potential last timeslot in which the ECCA countdown of the first unlicensed carrier ends does not occur past the threshold timeslot), the CCA module 1610 decides to perform the CCA check on the second unlicensed carrier during the timeslot in which the ECCA countdown of the first unlicensed carrier ends. The data processing module 1606 then transmits (via the transmitting module 1612) the data on the second unlicensed carrier if the CCA check is clear.

Based on a positive result (i.e., the potential last timeslot in which the ECCA countdown of the first unlicensed carrier ends occurs past the threshold timeslot), the CCA module 1610 may remain idle on the second unlicensed carrier. Alternatively, the CCA module 1610 may decide to perform the CCA check on the second unlicensed carrier during the threshold timeslot. If the CCA check is performed on the second unlicensed carrier, the data processing module 1606 may thereafter transmit (via the transmitting module 1612) the data on the second unlicensed carrier if the CCA check is clear.

In still a further aspect, the ECCA module 1608 performs an ECCA countdown on a first unlicensed carrier and determines a potential last timeslot in which the ECCA countdown of the first unlicensed carrier ends. Thereafter, the CCA module 1610 performs a CCA check of both the first and a second of the least two unlicensed carriers during the determined timeslot. The data processing module 1606 transmits (via the transmitting module 1612) the data on any of the first and the second of the at least two unlicensed carrier when the CCA check is clear.

In yet a further aspect, the ECCA module 1608 performs an ECCA countdown on a first unlicensed carrier and a second unlicensed carrier. One or more of the data processing module 1606, the ECCA module 1608, or the CCA module 1610 can enter a self-deferral state for one or more of the first unlicensed carrier or the second unlicensed carrier at the end of the ECCA countdown. The CCA module 1610 can perform an initial CCA (ICCA) of one or more of the first unlicensed carrier or the second unlicensed carrier. The data processing module 1606 can transmit (via the transmitting module 1612) the data if the ICCA clears on one or more of the first unlicensed carrier or the second unlicensed carrier.

In an aspect, if the apparatus 1602 is embodied as a UE (e.g., UE 115), then the data may be transmitted to a base station 1650. In another aspect, if the apparatus 1602 is embodied as a base station (e.g., base station 105), then the data may be transmitted to a UE 1660.

In a further aspect, if the apparatus 1602 is embodied as the UE (e.g., UE 115), the scheduling module 1614 may receive (via the receiving module 1504) from the base station 1650 (or another network entity) a schedule for transmitting over one or more of the at least two unlicensed carriers. The schedule may indicate a maximum number of timeslots for remaining idle on the first unlicensed carrier, a validity of a resource grant on at least one of the first unlicensed carrier or the second unlicensed carrier, and/or a priority among unlicensed carriers for transmission to the base station. The schedule may also include information related to transmitting a physical uplink control channel (PUCCH).

The apparatus may include additional modules that perform each of the steps of the algorithm in the aforementioned flow charts of FIGS. 11-15. As such, each step in the aforementioned flow charts of FIGS. 11-15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
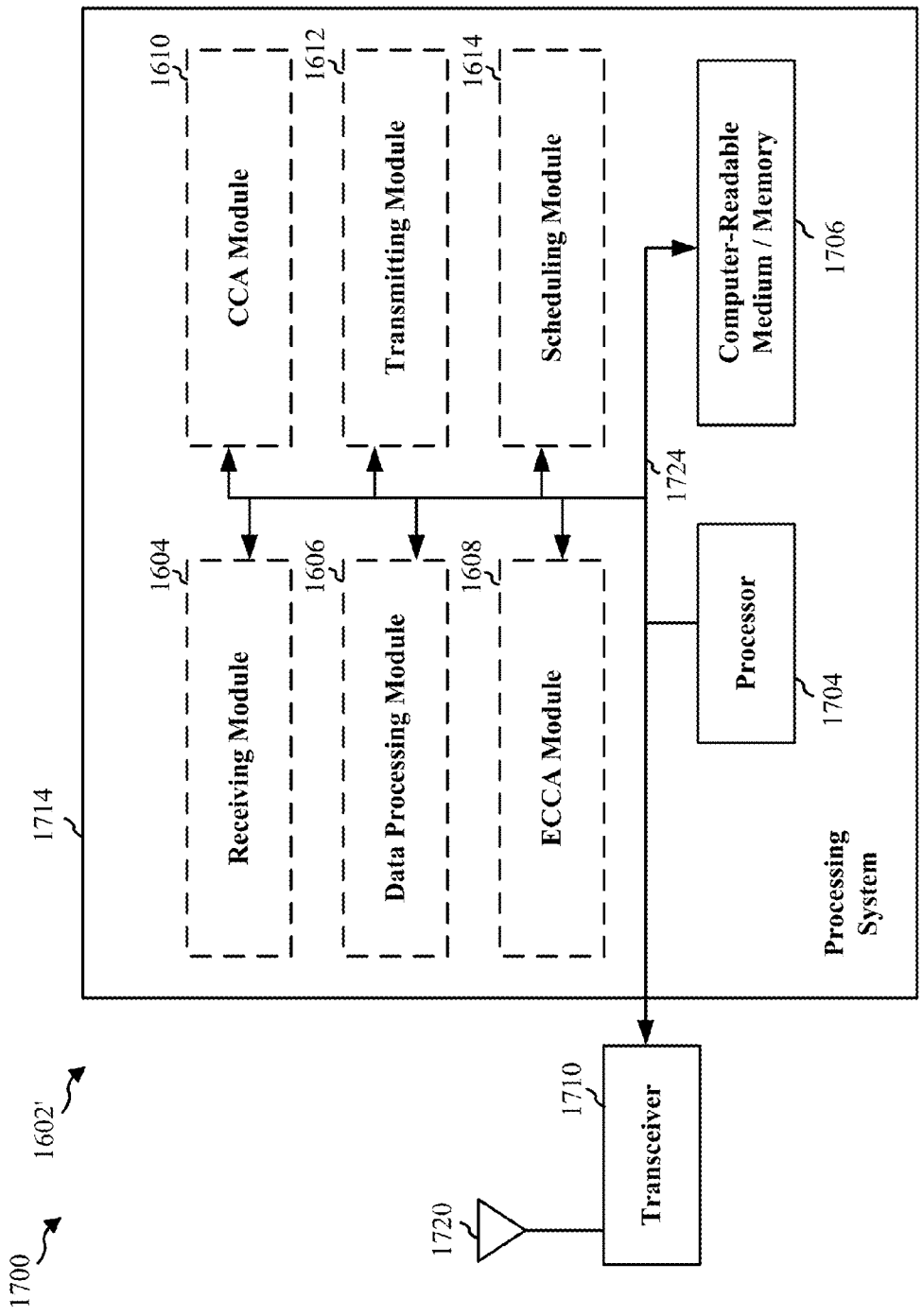
FIG. 17 is a diagram illustrating an example of a hardware implementation for an apparatus 1602' employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610, 1612, 1614, and the computer-readable medium/memory 1706. The bus 1724 may also link various other circuits such as timing sources, peripherals, voltage regulators, and power management circuits, which are well known in the art, and therefore, will not be described any further. The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the receiving module 1604. In addition, the transceiver 1710 receives information from the processing system 1714, specifically the transmitting module 1612, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the modules 1604, 1606, 1608, 1610, 1612, and 1614. The modules may be software modules running in the processor 1704, resident/stored in the computer readable medium/memory 1706, one or more hardware modules coupled to the processor 1704, or some combination thereof. The processing system 1714 may be a component of the base station 105 and may include the memory 442 and/or at least one of the TX processor 420, the RX processor 438, and the controller/processor 440. The processing system 1714 may alternatively be a component of the UE 115 and may include the memory 482 and/or at least one of the TX processor 464, the RX processor 458, and the controller/processor 480. In one configuration, the apparatus 1602/1602' for wireless communication includes means for receiving data for transmission over at least two unlicensed carriers, the at least two unlicensed carriers including a first unlicensed carrier and a second unlicensed carrier; means for performing an extended clear channel assessment (ECCA) countdown on the first unlicensed carrier; means for determining a potential last timeslot from one or more potential last timeslots of the ECCA countdown on the first unlicensed carrier; means for performing a clear channel assessment (CCA) check on the second unlicensed carrier during the potential last timeslot, means for determining if the ECCA countdown of the first unlicensed carrier is clear during the potential last timeslot; means for determining if the CCA check of the second unlicensed carrier is clear during the potential last timeslot; means for transmitting the data on one or more of the first unlicensed carrier or the second unlicensed carrier when one or more of the ECCA countdown of the first unlicensed carrier is clear during the potential last timeslot or the CCA check of the second unlicensed carrier is clear during the potential last timeslot; means for entering a freeze state on the second unlicensed carrier until the ECCA countdown of the first unlicensed carrier clears when the ECCA countdown of the first unlicensed carrier is not clear during the potential last timeslot; means for transmitting the data on one or more of the first unlicensed carrier or the second unlicensed carrier when the ECCA countdown of the first unlicensed carrier clears when the ECCA countdown of the first unlicensed carrier is not clear during the potential last timeslot; means for remaining idle on the first unlicensed carrier for at least one additional timeslot after the potential last timeslot until the CCA check of the second unlicensed carrier clears when the CCA check of the second unlicensed carrier is not clear during the potential last timeslot; means for transmitting the data on one or more of the first unlicensed carrier or the second unlicensed carrier when the CCA check of the second unlicensed carrier clears when the CCA check of the second unlicensed carrier is not clear during the potential last timeslot; means for receiving, from a base station, a schedule for transmitting the data over one or more of the at least two unlicensed carriers, wherein the schedule indicates at least one of a maximum number of timeslots for remaining idle on the first unlicensed carrier, a validity of a resource grant on at least one of the first unlicensed carrier or the second unlicensed carrier, or a priority among unlicensed carriers for transmitting the data to the base station, wherein the schedule comprises information related to transmitting a physical uplink control channel (PUCCH); means for performing an extended clear channel assessment (ECCA) countdown on each of the at least two unlicensed carriers, means for determining a potential last timeslot from one or more potential last timeslots of the ECCA countdown on the second unlicensed carrier; means for performing a clear channel assessment (CCA) check on the first unlicensed carrier during the potential last timeslot; means for remaining idle on the first unlicensed carrier during at least one timeslot after the ECCA countdown of the first unlicensed carrier until the potential last timeslot of the ECCA countdown on the second unlicensed carrier is reached; means for determining if the CCA check on the first unlicensed carrier is clear during the potential last timeslot; means for determining if the ECCA countdown on the second unlicensed carrier is clear during the potential last timeslot; means for transmitting the data on one or more of the first unlicensed carrier or the second unlicensed carrier when one or more of the CCA check of the first unlicensed carrier is clear during the potential last timeslot or the ECCA countdown of the second unlicensed carrier is clear during the potential last timeslot; means for entering a freeze state on the second unlicensed carrier until the CCA check clears when the CCA check of the first unlicensed carrier is not clear during the potential last timeslot; means for transmitting the data on one or more of the first unlicensed carrier or the second unlicensed carrier when the CCA check clears the first unlicensed carrier when the CCA check of the first unlicensed carrier is not clear during the potential last timeslot; means for remaining idle on the first unlicensed carrier for at least one additional timeslot after the potential last timeslot until the ECCA countdown of the second unlicensed carrier clears when it is determined that the ECCA countdown of the second unlicensed carrier is not clear during the potential last timeslot; means for transmitting the data on one or more of the first unlicensed carrier or the second unlicensed carrier when the ECCA countdown on the second unlicensed carrier clears when it is determined that the ECCA countdown of the second unlicensed carrier is not clear during the potential last timeslot; means for determining a potential number of timeslots between an end of the ECCA countdown of the first unlicensed carrier and the potential last timeslot in which the ECCA countdown of the second unlicensed carrier ends when it is determined that the ECCA countdown of the second unlicensed carrier is not clear during the potential last timeslot; means for performing the CCA check on the first unlicensed carrier when the potential number of timeslots is greater than a threshold; means for determining a first potential countdown value for performing the ECCA countdown of the first unlicensed carrier; means for determining a second potential countdown value between an end of the ECCA countdown of the first unlicensed carrier and an end of the ECCA countdown of the second unlicensed carrier; means for performing the CCA check on the first unlicensed carrier when a duty cycle is greater than a threshold, wherein the duty cycle is equal to the second potential countdown value divided by a sum of the first potential countdown value and the second potential countdown value; means for performing an extended clear channel assessment (ECCA) countdown on the first unlicensed carrier; means for determining whether a potential last timeslot of the ECCA countdown on the first unlicensed carrier occurs past a threshold timeslot of the second unlicensed carrier; means for deciding whether to perform a clear channel assessment (CCA) check on the second unlicensed carrier based on the determination; means for performing a clear channel assessment (CCA) check of both the first unlicensed carrier and the second unlicensed carrier during the potential last timeslot; means for transmitting the data on one or more of the first unlicensed carrier or the second unlicensed carrier if the CCA check of the first unlicensed carrier clears; means for performing an extended clear channel assessment (ECCA) countdown on the first unlicensed carrier and the second unlicensed carrier; means for entering a deferral state on one or more of the first unlicensed carrier or the second unlicensed carrier; means for performing an initial clear channel assessment (ICCA) on the one or more of the first unlicensed carrier or the second unlicensed carrier at an end of the deferral state; and means for transmitting the data on the one or more of the first unlicensed carrier or the second unlicensed carrier if the ICCA clears.

The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 420, the RX Processor 438, and the controller/processor 440. As such, in one configuration, the aforementioned means may be the TX Processor 420, the RX Processor 438, and the controller/processor 440 configured to perform the functions recited by the aforementioned means. Alternatively, as described supra, the processing system 1714 may include the TX Processor 464, the RX Processor 458, and the controller/processor 480. As such, in one configuration, the aforementioned means may be the TX Processor 464, the RX Processor 458, and the controller/processor 480 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving data for transmission over at least two unlicensed carriers, the at least two unlicensed carriers including a first unlicensed carrier and a second unlicensed carrier;
performing an extended clear channel assessment (ECCA) countdown during a set of time slots on the first unlicensed carrier;
determining a potential last timeslot from one or more potential last timeslots of the ECCA countdown during the set of time slots on the first unlicensed carrier; and
performing, in response to the determination of the potential last timeslot, a clear channel assessment (CCA) check on the second unlicensed carrier during the potential last timeslot.

2. The method of claim 1, further comprising:
determining if the ECCA countdown of the first unlicensed carrier is clear during the potential last timeslot; and
determining if the CCA check of the second unlicensed carrier is clear during the potential last timeslot.

3. The method of claim 2, further comprising:
transmitting the data on one or more of the first unlicensed carrier or the second unlicensed carrier when one or more of the ECCA countdown of the first unlicensed carrier is clear during the potential last timeslot or the CCA check of the second unlicensed carrier is clear during the potential last timeslot.

4. The method of claim 2, further comprising:
entering a freeze state on the second unlicensed carrier until the ECCA countdown of the first unlicensed carrier clears when the ECCA countdown of the first unlicensed carrier is not clear during the potential last timeslot; and
transmitting the data on one or more of the first unlicensed carrier or the second unlicensed carrier when the ECCA countdown of the first unlicensed carrier clears.

5. The method of claim 2, further comprising:
remaining idle on the first unlicensed carrier for at least one additional timeslot after the potential last timeslot until the CCA check of the second unlicensed carrier clears when the CCA check of the second unlicensed carrier is not clear during the potential last timeslot; and
transmitting the data on one or more of the first unlicensed carrier or the second unlicensed carrier when the CCA check of the second unlicensed carrier clears.

6. The method of claim 1, further comprising receiving, from a base station, a schedule for transmitting the data over one or more of the at least two unlicensed carriers.

7. The method of claim 6, wherein the schedule indicates at least one of:
a maximum number of timeslots for remaining idle on the first unlicensed carrier;
a validity of a resource grant on at least one of the first unlicensed carrier or the second unlicensed carrier; or
a priority among unlicensed carriers for transmitting the data to the base station.

8. The method of claim 6, wherein the schedule comprises information related to transmitting a physical uplink control channel (PUCCH).

9. A method of wireless communication, comprising:
receiving data for transmission over at least two unlicensed carriers, the at least two unlicensed carriers including a first unlicensed carrier and a second unlicensed carrier;
performing an extended clear channel assessment (ECCA) countdown during a set of time slots on each of the at least two unlicensed carriers;
determining a potential last timeslot from one or more potential last timeslots of the ECCA countdown during the set of time slots on the second unlicensed carrier; and
performing, in response to the determination of the potential last timeslot, a clear channel assessment (CCA) check on the first unlicensed carrier during the potential last timeslot.

10. The method of claim 9, further comprising remaining idle on the first unlicensed carrier during at least one timeslot after the ECCA countdown of the first unlicensed carrier until the potential last timeslot of the ECCA countdown on the second unlicensed carrier is reached.

11. The method of claim 10, further comprising:
determining if the CCA check on the first unlicensed carrier is clear during the potential last timeslot; and
determining if the ECCA countdown on the second unlicensed carrier is clear during the potential last timeslot.

12. The method of claim 11, further comprising:
transmitting the data on one or more of the first unlicensed carrier or the second unlicensed carrier when one or more of the CCA check of the first unlicensed carrier is clear during the potential last timeslot or the ECCA countdown of the second unlicensed carrier is clear during the potential last timeslot.

13. The method of claim 11, further comprising:
entering a freeze state on the second unlicensed carrier until the CCA check clears when the CCA check of the first unlicensed carrier is not clear during the potential last timeslot; and
transmitting the data on one or more of the first unlicensed carrier or the second unlicensed carrier when the CCA check clears the first unlicensed carrier.

14. The method of claim 11, further comprising:
remaining idle on the first unlicensed carrier for at least one additional timeslot after the potential last timeslot until the ECCA countdown of the second unlicensed carrier clears when the ECCA countdown of the second unlicensed carrier is not clear during the potential last timeslot; and
transmitting the data on one or more of the first unlicensed carrier or the second unlicensed carrier when the ECCA countdown on the second unlicensed carrier clears.

15. The method of claim 9, wherein the performing the CCA check comprises:
determining a potential number of timeslots between an end of the ECCA countdown of the first unlicensed carrier and the potential last timeslot in which the ECCA countdown of the second unlicensed carrier ends; and
performing the CCA check on the first unlicensed carrier when the potential number of timeslots is greater than a threshold.

16. The method of claim 9, wherein the performing the CCA check comprises:

determining a first potential countdown value for performing the ECCA countdown of the first unlicensed carrier;

determining a second potential countdown value between an end of the ECCA countdown of the first unlicensed carrier and an end of the ECCA countdown of the second unlicensed carrier; and performing the CCA check on the first unlicensed carrier when a duty cycle is greater than a threshold, wherein the duty cycle is equal to the second potential countdown value divided by a sum of the first potential countdown value and the second potential countdown value.

17. The method of claim 9, further comprising receiving, from a base station, a schedule for transmitting over one or more of the at least two unlicensed carriers.

18. The method of claim 17, wherein the schedule indicates at least one of:
a maximum number of timeslots for remaining idle on the first unlicensed carrier;
a validity of a resource grant on at least one of the first unlicensed carrier or the second unlicensed carrier; or
a priority among unlicensed carriers for transmission to the base station.

19. The method of claim 17, wherein the schedule comprises information related to transmitting a physical uplink control channel (PUCCH).

20. A method of wireless communication, comprising:
receiving data for transmission over at least two unlicensed carriers, the at least two unlicensed carriers including a first unlicensed carrier and a second unlicensed carrier;
performing an extended clear channel assessment (ECCA) countdown during a set of time slots on the first unlicensed carrier;
determining whether a potential last timeslot of the ECCA countdown during the set of time slots on the first unlicensed carrier occurs past a threshold timeslot of the second unlicensed carrier; and
deciding whether to perform a clear channel assessment (CCA) check on the second unlicensed carrier based on the determination.

21. The method of claim 20, further comprising:
performing a CCA check on the first unlicensed carrier and the CCA check on the second unlicensed carrier during the potential last timeslot; and
transmitting the data on one or more of the first unlicensed carrier or the second unlicensed carrier if the CCA check of the first unlicensed carrier clears.

22. A method of wireless communication, comprising:
receiving data for transmission over at least two unlicensed carriers, the at least two unlicensed carriers including a first unlicensed carrier and a second unlicensed carrier;
performing an extended clear channel assessment (ECCA) countdown during a set of time slots on the first unlicensed carrier and the second unlicensed carrier;
entering, after the ECCA countdown, a deferral state on one or more of the first unlicensed carrier or the second unlicensed carrier;
performing an initial clear channel assessment (ICCA) on the one or more of the first unlicensed carrier or the second unlicensed carrier at an end of the deferral state; and transmitting the data on the one or more of the first unlicensed carrier or the second unlicensed carrier if the ICCA clears.

23. An apparatus for wireless communication, comprising:
means for receiving data for transmission over at least two unlicensed carriers, the at least two unlicensed carriers including a first unlicensed carrier and a second unlicensed carrier;
means for performing an extended clear channel assessment (ECCA) countdown during a set of time slots on the first unlicensed carrier;
means for determining a potential last timeslot from one or more potential last timeslots of the ECCA countdown during the set of time slots on the first unlicensed carrier; and
means for performing, in response to the determination of the potential last timeslot, a clear channel assessment (CCA) check on the second unlicensed carrier during the potential last timeslot.

24. The apparatus of claim 23, further comprising:
means for determining if the ECCA countdown of the first unlicensed carrier is clear during the potential last timeslot; and
means for determining if the CCA check of the second unlicensed carrier is clear during the potential last timeslot.

25. The apparatus of claim 24, further comprising:
means for transmitting the data on one or more of the first unlicensed carrier or the second unlicensed carrier when one or more of the ECCA countdown of the first unlicensed carrier is clear during the potential last timeslot or the CCA check of the second unlicensed carrier is clear during the potential last timeslot.

26. The apparatus of claim 24, further comprising:
means for entering a freeze state on the second unlicensed carrier until the ECCA countdown of the first unlicensed carrier clears when the ECCA countdown of the first unlicensed carrier is not clear during the potential last timeslot; and
means for transmitting the data on one or more of the first unlicensed carrier or the second unlicensed carrier when the ECCA countdown of the first unlicensed carrier clears.

27. The apparatus of claim 24, further comprising:
means for remaining idle on the first unlicensed carrier for at least one additional timeslot after the potential last timeslot until the CCA check of the second unlicensed carrier clears when the CCA check of the second unlicensed carrier is not clear during the potential last timeslot; and
means for transmitting the data on one or more of the first unlicensed carrier or the second unlicensed carrier when the CCA check of the second unlicensed carrier clears.

28. The apparatus of claim 23, further comprising means for receiving, from a base station, a schedule for transmitting the data over one or more of the at least two unlicensed carriers.

29. The apparatus of claim 28, wherein the schedule indicates at least one of:
a maximum number of timeslots for remaining idle on the first unlicensed carrier;
a validity of a resource grant on at least one of the first unlicensed carrier or the second unlicensed carrier; or
a priority among unlicensed carriers for transmitting the data to the base station.

30. The apparatus of claim 28, wherein the schedule comprises information related to transmitting a physical uplink control channel (PUCCH).

31. An apparatus for wireless communication, comprising:
- means for receiving data for transmission over at least two unlicensed carriers, the at least two unlicensed carriers including a first unlicensed carrier and a second unlicensed carrier;
- means for performing an extended clear channel assessment (ECCA) countdown during a set of time slots on each of the at least two unlicensed carriers;
- means for determining a potential last timeslot from one or more potential last timeslots of the ECCA countdown during the set of time slots on the second unlicensed carrier; and
- means for performing, in response to the determination of the potential last timeslot, a clear channel assessment (CCA) check on the first unlicensed carrier during the potential last timeslot.

32. The apparatus of claim 31, further comprising means for remaining idle on the first unlicensed carrier during at least one timeslot after the ECCA countdown of the first unlicensed carrier until the potential last timeslot of the ECCA countdown on the second unlicensed carrier is reached.

33. The apparatus of claim 31, further comprising:
- means for determining if the CCA check on the first unlicensed carrier is clear during the potential last timeslot; and
- means for determining if the ECCA countdown on the second unlicensed carrier is clear during the potential last timeslot.

34. The apparatus of claim 33, further comprising:
- transmitting the data on one or more of the first unlicensed carrier or the second unlicensed carrier when one or more of the CCA check of the first unlicensed carrier is clear during the potential last timeslot or the ECCA countdown of the second unlicensed carrier is clear during the potential last timeslot.

35. The apparatus of claim 33, further comprising:
- means for entering a freeze state on the second unlicensed carrier until the CCA check clears when the CCA check of the first unlicensed carrier is not clear during the potential last timeslot; and
- means for transmitting the data on one or more of the first unlicensed carrier or the second unlicensed carrier when the CCA check clears the first unlicensed carrier.

36. The apparatus of claim 33, further comprising:
- means for remaining idle on the first unlicensed carrier for at least one additional timeslot after the potential last timeslot until the ECCA countdown of the second unlicensed carrier clears when the ECCA countdown of the second unlicensed carrier is not clear during the potential last timeslot; and
- means for transmitting the data on one or more of the first unlicensed carrier or the second unlicensed carrier when the ECCA countdown on the second unlicensed carrier clears.

37. The apparatus of claim 31, wherein the means for performing the CCA check comprises:
- means for determining a potential number of timeslots between an end of the ECCA countdown of the first unlicensed carrier and the potential last timeslot in which the ECCA countdown of the second unlicensed carrier ends; and
- means for performing the CCA check on the first unlicensed carrier when the potential number of timeslots is greater than a threshold.

38. The apparatus of claim 31, wherein the means for performing the CCA check comprises:
- means for determining a first potential countdown value for performing the ECCA countdown of the first unlicensed carrier;
- means for determining a second potential countdown value between an end of the ECCA countdown of the first unlicensed carrier and an end of the ECCA countdown of the second unlicensed carrier; and
- means for performing the CCA check on the first unlicensed carrier when a duty cycle is greater than a threshold, wherein the duty cycle is equal to the second potential countdown value divided by a sum of the first potential countdown value and the second potential countdown value.

39. The apparatus of claim 31, further comprising means for receiving, from a base station, a schedule for transmitting over one or more of the at least two unlicensed carriers.

40. The apparatus of claim 39, wherein the schedule indicates at least one of:
- a maximum number of timeslots for remaining idle on the first unlicensed carrier;
- a validity of a resource grant on at least one of the first unlicensed carrier or the second unlicensed carrier; or
- a priority among unlicensed carriers for transmission to the base station.

41. The apparatus of claim 39, wherein the schedule comprises information related to transmitting a physical uplink control channel (PUCCH).

42. An apparatus for wireless communication, comprising:
- means for receiving data for transmission over at least two unlicensed carriers, the at least two unlicensed carriers including a first unlicensed carrier and a second unlicensed carrier;
- means for performing an extended clear channel assessment (ECCA) countdown during a set of time slots on the first unlicensed carrier;
- means for determining whether a potential last timeslot of the ECCA countdown during the set of time slots on the first unlicensed carrier occurs past a threshold timeslot of the second unlicensed carrier; and
- means for deciding whether to perform a clear channel assessment (CCA) check on the second unlicensed carrier based on the determination.

43. Then apparatus of claim 42, further comprising:
- means for performing a CCA check on the first unlicensed carrier and the CCA check on the second unlicensed carrier during the potential last timeslot; and
- means for transmitting the data on one or more of the first unlicensed carrier or the second unlicensed carrier if the CCA check of the first unlicensed carrier clears.

44. An apparatus for wireless communication, comprising:
- means for receiving data for transmission over at least two unlicensed carriers, the at least two unlicensed carriers including a first unlicensed carrier and a second unlicensed carrier;
- means for performing an extended clear channel assessment (ECCA) countdown during a set of time slots on the first unlicensed carrier and the second unlicensed carrier;

means for entering, after the ECCA countdown, a deferral state on one or more of the first unlicensed carrier or the second unlicensed carrier;

means for performing an initial clear channel assessment (ICCA) on the one or more of the first unlicensed carrier or the second unlicensed carrier at an end of the deferral state; and means for transmitting the data on the one or more of the first unlicensed carrier or the second unlicensed carrier if the ICCA clears.

45. An apparatus for wireless communication, comprising:
a memory; and
at least one processor coupled to the memory and configured to:
receive data for transmission over at least two unlicensed carriers, the at least two unlicensed carriers including a first unlicensed carrier and a second unlicensed carrier;
perform an extended clear channel assessment (ECCA) countdown during a set of time slots on the first unlicensed carrier;
determine a potential last timeslot from one or more potential last timeslots of the ECCA countdown during the set of time slots on the first unlicensed carrier; and
perform, in response to the determination of the potential last timeslot, a clear channel assessment (CCA) check on the second unlicensed carrier during the potential last timeslot.

46. The apparatus of claim 45, wherein the at least one processor is further configured to:
determine if the ECCA countdown of the first unlicensed carrier is clear during the potential last timeslot; and
determine if the CCA check of the second unlicensed carrier is clear during the potential last timeslot.

47. The apparatus of claim 46, wherein the at least one processor is further configured to:
transmit the data on one or more of the first unlicensed carrier or the second unlicensed carrier when one or more of the ECCA countdown of the first unlicensed carrier is clear during the potential last timeslot or the CCA check of the second unlicensed carrier is clear during the potential last timeslot.

48. The apparatus of claim 46, the at least one processor is further configured to:
enter a freeze state on the second unlicensed carrier until the ECCA countdown of the first unlicensed carrier clears when the ECCA countdown of the first unlicensed carrier is not clear during the potential last timeslot; and
transmit the data on one or more of the first unlicensed carrier or the second unlicensed carrier when the ECCA countdown of the first unlicensed carrier clears.

49. The apparatus of claim 46, the at least one processor is further configured to:
remain idle on the first unlicensed carrier for at least one additional timeslot after the potential last timeslot until the CCA check of the second unlicensed carrier clears when the CCA check of the second unlicensed carrier is not clear during the potential last timeslot; and
transmit the data on one or more of the first unlicensed carrier or the second unlicensed carrier when the CCA check of the second unlicensed carrier clears.

50. The apparatus of claim 45, wherein the at least one processor is further configured to receive, from a base station, a schedule for transmitting the data over one or more of the at least two unlicensed carriers.

51. The apparatus of claim 50, wherein the schedule indicates at least one of:
a maximum number of timeslots for remaining idle on the first unlicensed carrier;
a validity of a resource grant on at least one of the first unlicensed carrier or the second unlicensed carrier; or
a priority among unlicensed carriers for transmitting the data to the base station.

52. The apparatus of claim 50, wherein the schedule comprises information related to transmitting a physical uplink control channel (PUCCH).

53. An apparatus for wireless communication, comprising:
a memory; and
at least one processor coupled to the memory and configured to:
receive data for transmission over at least two unlicensed carriers, the at least two unlicensed carriers including a first unlicensed carrier and a second unlicensed carrier;
perform an extended clear channel assessment (ECCA) countdown during a set of time slots on each of the at least two unlicensed carriers;
determine a potential last timeslot from one or more potential last timeslots of the ECCA countdown during the set of time slots on the second unlicensed carrier; and
perform, in response to the determination of the potential last timeslot, a clear channel assessment (CCA) check on the first unlicensed carrier during the potential last timeslot.

54. The apparatus of claim 53, wherein the at least one processor is further configured to remain idle on the first unlicensed carrier during at least one timeslot after the ECCA countdown of the first unlicensed carrier until the potential last timeslot of the ECCA countdown on the second unlicensed carrier is reached.

55. The apparatus of claim 54, wherein the at least one processor is further configured to:
determine if the CCA check on the first unlicensed carrier is clear during the potential last timeslot; and
determine if the ECCA countdown on the second unlicensed carrier is clear during the potential last timeslot.

56. The apparatus of claim 55, wherein the at least one processor is further configured to:
transmit the data on one or more of the first unlicensed carrier or the second unlicensed carrier when one or more of the CCA check of the first unlicensed carrier is clear during the potential last timeslot or the ECCA countdown of the second unlicensed carrier is clear during the potential last timeslot.

57. The apparatus of claim 55, wherein the at least one processor is further configured to:
enter a freeze state on the second unlicensed carrier until the CCA check clears; and
transmit the data on one or more of the first unlicensed carrier or the second unlicensed carrier when the CCA check clears the first unlicensed carrier when the CCA check of the first unlicensed carrier is not clear during the potential last timeslot.

58. The apparatus of claim 55, wherein the at least one processor is further configured to:
remain idle on the first unlicensed carrier for at least one additional timeslot after the potential last timeslot until the ECCA countdown of the second unlicensed carrier clears when the ECCA countdown of the second unlicensed carrier is not clear during the potential last timeslot; and transmit the data on one or more of the first unlicensed carrier or the second unlicensed carrier when the ECCA countdown on the second unlicensed carrier clears.

59. The apparatus of claim 53, wherein the at least one processor is further configured to perform the CCA check by:

determining a potential number of timeslots between an end of the ECCA countdown of the first unlicensed carrier and the potential last timeslot in which the ECCA countdown of the second unlicensed carrier ends; and performing the CCA check on the first unlicensed carrier when the potential number of timeslots is greater than a threshold.

60. The apparatus of claim 53, wherein the at least one processor is further configured to perform the CCA check by:

determining a first potential countdown value for performing the ECCA countdown of the first unlicensed carrier;

determining a second potential countdown value between an end of the ECCA countdown of the first unlicensed carrier and an end of the ECCA countdown of the second unlicensed carrier; and performing the CCA check on the first unlicensed carrier when a duty cycle is greater than a threshold, wherein the duty cycle is equal to the second potential countdown value divided by a sum of the first potential countdown value and the second potential countdown value.

61. The apparatus of claim 53, wherein the at least one processor is further configured to receive, from a base station, a schedule for transmitting over one or more of the at least two unlicensed carriers.

62. The apparatus of claim 61, wherein the schedule indicates at least one of:

a maximum number of timeslots for remaining idle on the first unlicensed carrier;

a validity of a resource grant on at least one of the first unlicensed carrier or the second unlicensed carrier; or a priority among unlicensed carriers for transmission to the base station.

63. The apparatus of claim 61, wherein the schedule comprises information related to transmitting a physical uplink control channel (PUCCH).

64. An apparatus for wireless communication, comprising:

a memory; and at least one processor coupled to the memory and configured to:

receive data for transmission over at least two unlicensed carriers, the at least two unlicensed carriers including a first unlicensed carrier and a second unlicensed carrier;

perform an extended clear channel assessment (ECCA) countdown during a set of time slots on the first unlicensed carrier;

determine whether a potential last timeslot of the ECCA countdown during the set of time slots on the first unlicensed carrier occurs past a threshold timeslot of the second unlicensed carrier; and decide whether to perform a clear channel assessment (CCA) check on the second unlicensed carrier based on the determination.

65. The apparatus of claim 64, wherein the at least one processor is further configured to:

perform a CCA check on the first unlicensed carrier and the CCA check on the second unlicensed carrier during the potential last timeslot; and transmit the data on one or more of the first unlicensed carrier or the second unlicensed carrier if the CCA check of the first unlicensed carrier clears.

66. An apparatus for wireless communication, comprising:

a memory; and at least one processor coupled to the memory and configured to:

receive data for transmission over at least two unlicensed carriers, the at least two unlicensed carriers including a first unlicensed carrier and a second unlicensed carrier;

perform an extended clear channel assessment (ECCA) countdown during a set of time slots on the first unlicensed carrier and the second unlicensed carrier;

enter, after the ECCA countdown, a deferral state on one or more of the first unlicensed carrier or the second unlicensed carrier;

perform an initial clear channel assessment (ICCA) on the one or more of the first unlicensed carrier or the second unlicensed carrier at an end of the deferral state; and transmit the data on the one or more of the first unlicensed carrier or the second unlicensed carrier if the ICCA clears.

67. A non-transitory computer-readable medium storing computer executable code for wireless communication, comprising code for:

receiving data for transmission over at least two unlicensed carriers, the at least two unlicensed carriers including a first unlicensed carrier and a second unlicensed carrier;

performing an extended clear channel assessment (ECCA) countdown during a set of time slots on the first unlicensed carrier;

determining a potential last timeslot from one or more potential last timeslots of the ECCA countdown during the set of time slots on the first unlicensed carrier; and performing, in response to the determination of the potential last timeslot, a clear channel assessment (CCA) check on the second unlicensed carrier during the potential last timeslot.

68. The non-transitory computer-readable medium of claim 67, further comprising code for:

determining if the ECCA countdown of the first unlicensed carrier is clear during the potential last timeslot; and determining if the CCA check of the second unlicensed carrier is clear during the potential last timeslot.

69. The non-transitory computer-readable medium of claim 68, further comprising code for:

transmitting the data on one or more of the first unlicensed carrier or the second unlicensed carrier when one or more of the ECCA countdown of the first unlicensed carrier is clear during the potential last timeslot or the CCA check of the second unlicensed carrier is clear during the potential last timeslot.

70. The non-transitory computer-readable medium of claim 68, further comprising code for:

entering a freeze state on the second unlicensed carrier until the ECCA countdown of the first unlicensed carrier clears when the ECCA countdown of the first unlicensed carrier is not clear during the potential last timeslot; and transmitting the data on one or more of the first unlicensed carrier or the second unlicensed carrier when the ECCA countdown of the first unlicensed carrier clears.

71. The non-transitory computer-readable medium of claim 68, further comprising code for:

remaining idle on the first unlicensed carrier for at least one additional timeslot after the potential last timeslot until the CCA check of the second unlicensed carrier clears when the CCA check of the second unlicensed carrier is not clear during the potential last timeslot; and transmitting the data on one or more of the first unlicensed carrier or the second unlicensed carrier when the CCA check of the second unlicensed carrier clears.

72. The non-transitory computer-readable medium of claim 67, further comprising code for receiving, from a base station, a schedule for transmitting the data over one or more of the at least two unlicensed carriers.

73. The non-transitory computer-readable medium of claim 72, wherein the schedule indicates at least one of:

a maximum number of timeslots for remaining idle on the first unlicensed carrier;

a validity of a resource grant on at least one of the first unlicensed carrier or the second unlicensed carrier; or a priority among unlicensed carriers for transmitting the data to the base station.

74. The non-transitory computer-readable medium of claim 72, wherein the schedule comprises information related to transmitting a physical uplink control channel (PUCCH).

75. A non-transitory computer-readable medium storing computer executable code for wireless communication, comprising code for:

receiving data for transmission over at least two unlicensed carriers, the at least two unlicensed carriers including a first unlicensed carrier and a second unlicensed carrier;

performing an extended clear channel assessment (ECCA) countdown during a set of time slots on each of the at least two unlicensed carriers;

determining a potential last timeslot from one or more potential last timeslots of the ECCA countdown during the set of time slots on the second unlicensed carrier; and performing, in response to the determination of the potential last timeslot, a clear channel assessment (CCA) check on the first unlicensed carrier during the potential last timeslot.

76. The non-transitory computer-readable medium of claim 75, further comprising code for remaining idle on the first unlicensed carrier during at least one timeslot after the ECCA countdown of the first unlicensed carrier until the potential last timeslot of the ECCA countdown on the second unlicensed carrier is reached.

77. The non-transitory computer-readable medium of claim 76, further comprising code for:

determining if the CCA check on the first unlicensed carrier is clear during the potential last timeslot; and determining if the ECCA countdown on the second unlicensed carrier is clear during the potential last timeslot.

78. The non-transitory computer-readable medium of claim 77, further comprising code for:

transmitting the data on one or more of the first unlicensed carrier or the second unlicensed carrier when one or more of the CCA check of the first unlicensed carrier is clear during the potential last timeslot or the ECCA countdown of the second unlicensed carrier is clear during the potential last timeslot.

79. The non-transitory computer-readable medium of claim 77, further comprising code for:

entering a freeze state on the second unlicensed carrier until the CCA check clears when the CCA check of the first unlicensed carrier is not clear during the potential last timeslot; and transmitting the data on one or more of the first unlicensed carrier or the second unlicensed carrier when the CCA check clears the first unlicensed carrier.

80. The non-transitory computer-readable medium of claim 77, further comprising code for:

remaining idle on the first unlicensed carrier for at least one additional timeslot after the potential last timeslot until the ECCA countdown of the second unlicensed carrier clears when the ECCA countdown of the second unlicensed carrier is not clear during the potential last timeslot; and transmitting the data on one or more of the first unlicensed carrier or the second unlicensed carrier when the ECCA countdown on the second unlicensed carrier clears.

81. The non-transitory computer-readable medium of claim 75, wherein the code for performing the CCA check further comprises code for:

determining a potential number of timeslots between an end of the ECCA countdown of the first unlicensed carrier and the potential last timeslot in which the ECCA countdown of the second unlicensed carrier ends; and performing the CCA check on the first unlicensed carrier when the potential number of timeslots is greater than a threshold.

82. The non-transitory computer-readable medium of claim 75, wherein the code for performing the CCA check further comprises code for:

determining a first potential countdown value for performing the ECCA countdown of the first unlicensed carrier;

determining a second potential countdown value between an end of the ECCA countdown of the first unlicensed carrier and an end of the ECCA countdown of the second unlicensed carrier; and performing the CCA check on the first unlicensed carrier when a duty cycle is greater than a threshold, wherein the duty cycle is equal to the second potential countdown value divided by a sum of the first potential countdown value and the second potential countdown value.

83. The non-transitory computer-readable medium of claim 75, further comprising code for receiving, from a base station, a schedule for transmitting over one or more of the at least two unlicensed carriers.

84. The non-transitory computer-readable medium of claim 83, wherein the schedule indicates at least one of:

a maximum number of timeslots for remaining idle on the first unlicensed carrier;

a validity of a resource grant on at least one of the first unlicensed carrier or the second unlicensed carrier; or a priority among unlicensed carriers for transmission to the base station.

85. The non-transitory computer-readable medium of claim 83, wherein the schedule comprises information related to transmitting a physical uplink control channel (PUCCH).

86. A non-transitory computer-readable medium storing computer executable code for wireless communication, comprising code for:
  receiving data for transmission over at least two unlicensed carriers, the at least two unlicensed carriers including a first unlicensed carrier and a second unlicensed carrier;
  performing an extended clear channel assessment (ECCA) countdown during a set of time slots on the first unlicensed carrier;
  determining whether a potential last timeslot of the ECCA countdown during the set of time slots on the first unlicensed carrier occurs past a threshold timeslot of the second unlicensed carrier; and deciding whether to perform a clear channel assessment (CCA) check on the second unlicensed carrier based on the determination.

87. The non-transitory computer-readable medium of claim 86, further comprising code for:
  performing a CCA check on the first unlicensed carrier and the CCA check on the second unlicensed carrier during the potential last timeslot; and
  transmitting the data on one or more of the first unlicensed carrier or the second unlicensed carrier if the CCA check of the first unlicensed carrier clears.

88. A non-transitory computer-readable medium storing computer executable code for wireless communication, comprising code for:
  receiving data for transmission over at least two unlicensed carriers, the at least two unlicensed carriers including a first unlicensed carrier and a second unlicensed carrier;
  performing an extended clear channel assessment (ECCA) countdown during a set of time slots on the first unlicensed carrier and the second unlicensed carrier;
  entering, after the ECCA countdown, a deferral state on one or more of the first unlicensed carrier or the second unlicensed carrier;
  performing an initial clear channel assessment (ICCA) on the one or more of the first unlicensed carrier or the second unlicensed carrier at an end of the deferral state; and
  transmitting the data on the one or more of the first unlicensed carrier or the second unlicensed carrier if the ICCA clears.

* * * * *